US011746876B2

(12) United States Patent
Lundbäck

(10) Patent No.: US 11,746,876 B2
(45) Date of Patent: Sep. 5, 2023

(54) COMPOUND PLANET GEAR ARRANGEMENT AND GEAR WHEEL ARRANGEMENT

(71) Applicant: CASCADE DRIVES AB, Stockholm (SE)

(72) Inventor: Stig Lundbäck, Stockholm (SE)

(73) Assignee: CASCADE DRIVES AB, Stockholm (SE)

( * ) Notice: Subject to any disclaimer, the term of this patent is extended or adjusted under 35 U.S.C. 154(b) by 180 days.

(21) Appl. No.: 16/496,043

(22) PCT Filed: Mar. 22, 2018

(86) PCT No.: PCT/EP2018/057348
§ 371 (c)(1),
(2) Date: Sep. 20, 2019

(87) PCT Pub. No.: WO2018/172479
PCT Pub. Date: Sep. 27, 2018

(65) Prior Publication Data
US 2020/0025278 A1     Jan. 23, 2020

(30) Foreign Application Priority Data

Mar. 23, 2017 (EP) .................................... 17162687
Mar. 23, 2017 (EP) .................................... 17162688
Mar. 23, 2017 (EP) .................................... 17162690

(51) Int. Cl.
*F16H 55/14*     (2006.01)
*F03D 15/00*     (2016.01)
(Continued)

(52) U.S. Cl.
CPC ............. *F16H 55/14* (2013.01); *F03D 15/00* (2016.05); *F16D 3/06* (2013.01); *F16D 3/12* (2013.01);
(Continued)

(58) Field of Classification Search
CPC .......... F16H 55/18; F16H 55/17; F16H 55/12; F16H 55/14; F16H 1/2863; F16H 57/12; F16H 2057/125; F16D 3/06; F16D 3/12
See application file for complete search history.

(56) References Cited

U.S. PATENT DOCUMENTS 2,307,129 A    1/1943   Hines et al.
2,707,884 A *   5/1955   Boisvert ................. F16H 55/12
                                                                                74/448
(Continued)

FOREIGN PATENT DOCUMENTS

CN        202326986 U     7/2012
CN        104500693 A *   4/2015
(Continued)

OTHER PUBLICATIONS

Guo, Y. et al., "Dynamic Analysis of Wind Turbine Planetary Gears Using An Extended Harmonic Balance Approach," NREL Conference Paper NREL/CP-5000-55355, Preprint Jun. 2012, 18 pages.
(Continued)

*Primary Examiner* — Gregory Robert Weber
(74) *Attorney, Agent, or Firm* — RMCK Law Group, PLC

(57) ABSTRACT

The invention relates generally to compound planet gear arrangements for transmitting torque between two rotating shafts, by splitting the torque into several torque transmitting gear components. The gear arrangements may contain gear shifts arrangement and free-wheel arrangements. The invention also relates to gear wheel arrangements having enhanced torsional compliance capabilities, which gear wheel arrangements advantageously may be used in said compound planet gear arrangements and also at other applications such as at other over-determined systems or where intermittent loads and forces occur. According to one aspect, the invention relates to a gear wheel arrangement (700, 800, (Continued)

900), comprising; a first part (710, 810, 910) which is arranged to be rotationally fixed to a shaft; a second part (720, 820, 920) which is rotatably connected to the first part and provided with gear teeth for meshing with an adjacent gear. The first and second parts are mechanically connected by means of at least one first elastically deformable member (750, 850, 950) which allows a limited relative rotation between the first and second part. The gear teeth (721, 821, 921) of the second part (710, 810, 910) are helical and the gear wheel arrangement is arranged to allow a limited relative axial displacement between the first part and the second part.

11 Claims, 16 Drawing Sheets

(51) Int. Cl.
| | | |
|---|---|---|
| *F16D 3/06* | (2006.01) | |
| *F16D 3/12* | (2006.01) | |
| *F16H 55/12* | (2006.01) | |
| *F16H 55/17* | (2006.01) | |
| *B60K 7/00* | (2006.01) | |
| *F16H 3/44* | (2006.01) | |

(52) U.S. Cl.
CPC ............ *F16H 55/12* (2013.01); *F16H 55/17* (2013.01); *B60K 7/0007* (2013.01); *B60K 2007/0061* (2013.01); *F05B 2260/403* (2013.01); *F05B 2260/79* (2013.01); *F16H 3/44* (2013.01)

(56) References Cited

U.S. PATENT DOCUMENTS

| | | | |
|---|---|---|---|
| 3,303,713 A | 2/1967 | Hicks | |
| 4,674,351 A | 6/1987 | Byrd | |
| 4,831,897 A | 5/1989 | Dobbs | |
| 5,174,169 A | 12/1992 | Allen | |
| 6,459,165 B1 | 10/2002 | Schoo | |
| 6,935,986 B2 | 8/2005 | Hvolka et al. | |
| 8,734,289 B2 | 5/2014 | Pinnekamp et al. | |
| 8,907,517 B2 | 12/2014 | Mongeau et al. | |
| 9,073,538 B2 | 7/2015 | Mack et al. | |
| 9,482,318 B2 | 11/2016 | Beck et al. | |
| 10,927,939 B1 * | 2/2021 | Hoban | F16D 3/68 |
| 10,968,997 B2 * | 4/2021 | Jeon | F16H 57/12 |
| 2003/0000783 A1 | 1/2003 | Kanai et al. | |
| 2003/0015052 A1 | 1/2003 | Hulshof | |
| 2009/0056488 A1 | 3/2009 | Beutler et al. | |
| 2010/0113210 A1 | 5/2010 | Lopez et al. | |
| 2010/0240490 A1 | 9/2010 | Schafer | |
| 2010/0252390 A1 * | 10/2010 | George | F16H 55/14 192/70.17 |
| 2016/0138696 A1 * | 5/2016 | Gielesberger | F16F 15/1215 74/411 |
| 2016/0230871 A1 * | 8/2016 | Hirano | F16H 55/14 |
| 2017/0097083 A1 * | 4/2017 | Dumanski | F16H 55/18 |
| 2017/0314665 A1 * | 11/2017 | Garcia | F16H 55/171 |
| 2018/0283522 A1 * | 10/2018 | Vaslin | F16D 3/64 |
| 2019/0334410 A1 * | 10/2019 | Uchimura | F16D 3/68 |

FOREIGN PATENT DOCUMENTS

| | | | | |
|---|---|---|---|---|
| DE | 1038086 B | * | 9/1958 | ............... F16D 3/58 |
| DE | 1038086 B | | 9/1958 | |
| DE | 1243924 B | | 7/1967 | |
| DE | 102007053509 A1 | | 1/2009 | |
| DE | 102010056068 A1 | | 6/2012 | |
| GB | 749175 A | | 5/1956 | |
| JP | 601434 A | | 1/1985 | |
| JP | 02150547 A | | 6/1990 | |
| JP | 09217816 A | | 8/1997 | |
| JP | 2011052625 A | | 3/2011 | |
| JP | 2015117740 A | | 6/2015 | |
| WO | 9641087 A1 | | 12/1996 | |
| WO | 2007119074 A1 | | 10/2007 | |

OTHER PUBLICATIONS

PCT International Preiminary Report on Patentability (IPRP) dated Jul. 11, 2019 with Correct Coverpage dated Sep. 12, 2019 for PCT International Application No. PCT/EP2018/057348, 15 pages.

PCT International Search Report and Written Opinion dated Sep. 14, 2018 for International Application No. PCT/EP2018/057348, 17 pages.

* cited by examiner

Fig. 3b
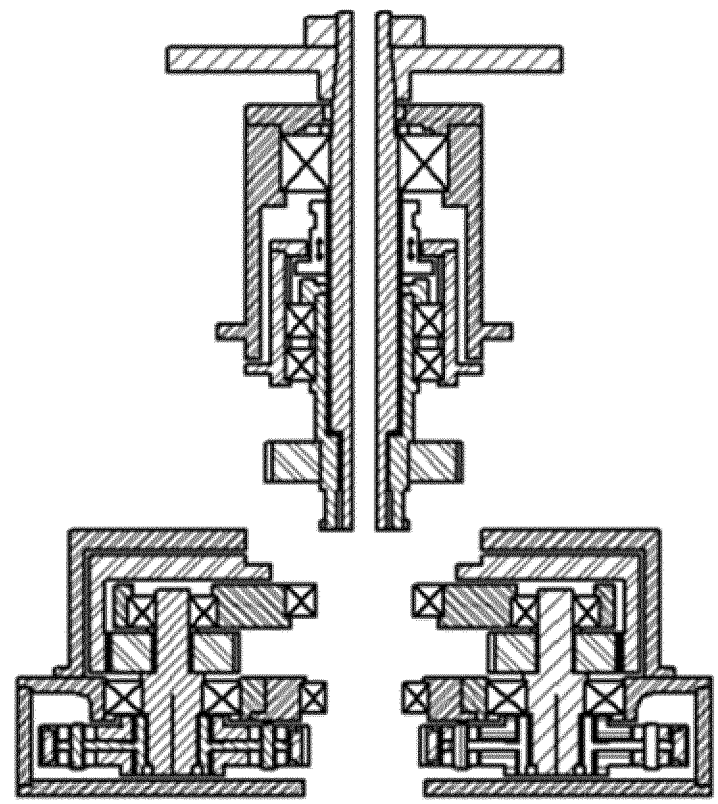
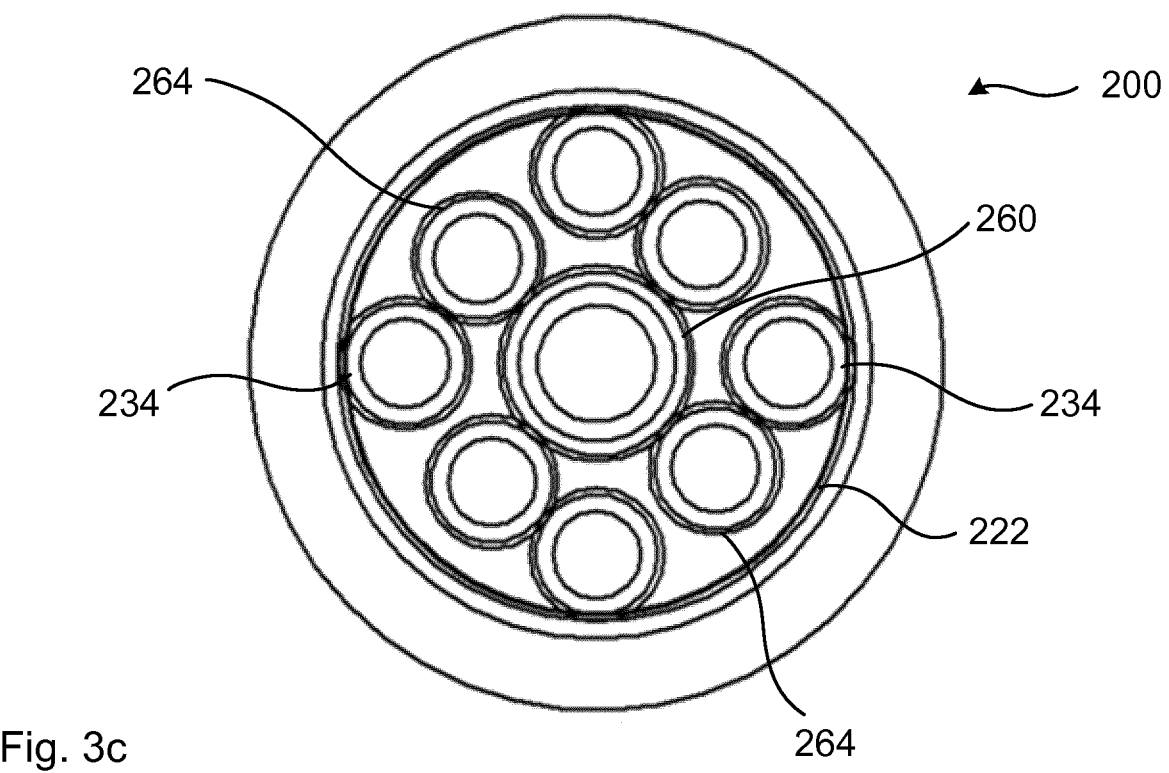
Fig. 3c

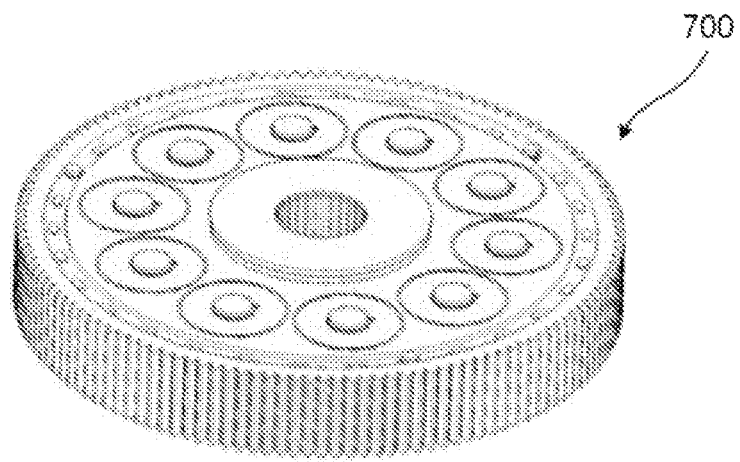
Fig. 8a
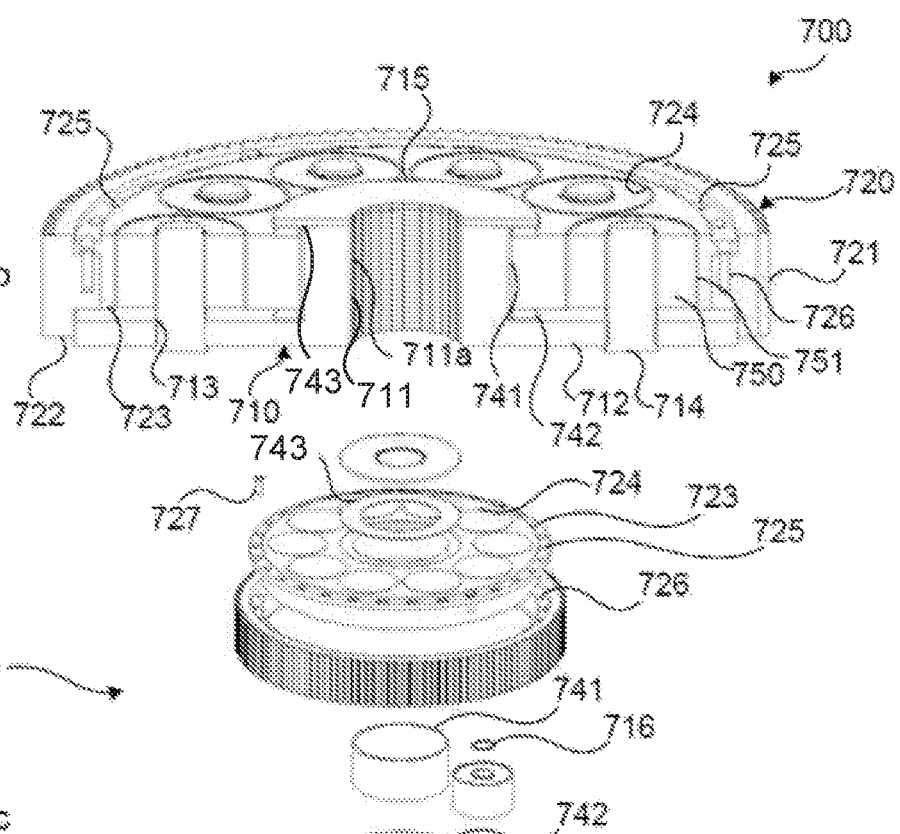
Fig. 8b
Fig. 8c

COMPOUND PLANET GEAR ARRANGEMENT AND GEAR WHEEL ARRANGEMENT

CROSS-REFERENCE TO RELATED APPLICATIONS

This application is a 371 U.S. National Stage of International Application No. PCT/EP2018/057348, filed Mar. 22, 2018, which claims priority to European Patent Application Nos. 17162687.2, 17162688.0, 17162689.8, and 17162690.6, each filed Mar. 23, 2017. The disclosures of each of the above applications are incorporated herein by reference in their entirety.

TECHNICAL FIELD

The invention relates generally to compound planet gear arrangements for transmitting torque between two rotating shafts, by splitting the torque into several torque transmitting gear components. The gear arrangements may contain gear shifts arrangement and free-wheel arrangements. The invention also relates to gear wheel arrangements having enhanced torsional compliance capabilities, which gear wheel arrangements advantageously may be used said compound planet gear arrangements and also at other applications such as at other over-determined systems or where intermittent loads and forces occur.

BACKGROUND

There are many applications where there exists a need for transforming rotational motion or torque into another rotational motion and torque. In most cases some kind of planetary and compound planetary gear arrangements may be used for such rotation to rotation arrangements.

Examples of such applications are devices as wind and fluid power mills where it is necessary to transform high torque at low RPM to lower torque with higher RPM or gas turbines with high RPM to lower RPM with higher torque.

In other driving examples such as combustion engines or electric motors in cars and trucks and other transport means on land, sea and in the air, these driving arrangements are in many cases using gearboxes often with shift in gear ratio to convert high RPM and low torque to high torque with low RPM in order to maintain a powerful and a efficient energy transformation.

The present invention has similarities with the well-known planetary gear constructions, but is equipped with new inventions that make it possible to create very compact light-weighted gearboxes with high gear ratio and possibilities to shift gear ratio and free wheel arrangement with marginal or no change in volume and weight of the gearbox. This can be of special interest when electric motors are used to power trucks and entrepreneur machines and other machines and arrangements during high forces as is needed during fast accelerations and retardations.

At gear arrangements, such as planetary gears, where the transmitted torque is split between several gear components there exists a problem with over determination of the gear arrangement. Such over determination may lead to unbalanced load and uneven wear of the gear components. The present invention is concerned not only with solving problems related to over determination but also to provide shock absorption to reduce transient forces occurring in the gear arrangement when the transmitted forces through the gear arrangement changes drastically. At these types of gear arrangements it is of vital interest that the entire arrangement is durable and has a long and predictable service life. A further important aspect is that volume-weight is as low as possible to the gear-ratio and that the gearboxes should be easy to assembly and maintain.

The present invention may be used at various applications of the above mentioned type and also in others. An application of certain interest to demonstrate how the present invention can improve the functionality of gear arrangement is the wind power generation industry. In this industry planetary gearboxes play a central part of the driveline from the turbine or rotor blades to the generator for generation of electrical power.

Turbulent winds changes due to large masses in motions, the propeller and generator, give rise to sudden and strong changes of the force direction through the gearbox. This change of direction together with the air gap and stiffness within the gearbox drive train results in shock waves and high overloads on the meshing teeth and in the bearings. Metal contacts between the gear teeth, will contaminate the oil in the gearbox. Optimizing oil qualities to RPM viscosities and cleanness is very important. To extend the lifetime even further it is necessary to create gearboxes where vulnerable parts can be replaced in place with new better optimized components, such as bearings and gears.

Furthermore, as described in NREL Conference paper; NREL/CP-5000-55355; "Dynamic Analysis of Wind Turbine Planetary Gears Using an Extended Harmonic Balance Approach, Preprint dated June 2012, by Y. Guo, J. Keller and R. Parker, transient forces is very common in windmills and might have a negative lifetime factor on this kind of arrangement to achieve even distributions of split torque through the gearboxes.

The cause of the low lifetime of windmill gearboxes is still not fully known though many different kinds of epicyclical gearboxes have been tested. Many windmill manufacturers are today looking for direct driven permanent magnet though they become very large, heavy and expensive using earth metal that is a limited recourse.

A gearbox is a device for power transmission which changes the rotation speed, torque and/or rotation from one rotating shaft to another. This power transfer between the axles is usually made through a collaborative meshing between two cylindrical gears. This means that only two tooth sides at a time with the rolling and sliding movements transmit the current torque. The meshing must, with its two mating tooth flanks, be dimensioned for the torque transmitted between the gears. This may be done by varying the gear diameter, width and meshing. Gear materials and hardness of the tooth flanks as well as the oil that lubricates the gearbox naturally constitute extremely important factors for increased strength and increased resistance to mechanical abrasions. In cylindrical gear boxes an upshifting occurs when a larger diameter driving gear meshes with a gear with smaller diameter driven gear. Correspondingly, downshifting occurs when a smaller diameter driving gear meshes with a larger diameter driven gear. At applications requiring high up- or downshifts, several gear steps can be needed. A first step of e.g. 1:5 could be complemented by a second step of e.g. 1:5, resulting in a total upshift of 1:25. If two meshing tooth flanks must be adapted for large input torques such as e.g. at extraction of wind energy to generate electrical energy, cylindrical gear arrangements can lead to large and heavy gearboxes in relation to its gear ratio. To avoid this problem various different planetary gearboxes have been suggested for providing a compact, energy-dense gear arrangement with high speed ratio, where speed ratio is to be understood as input speed in relation to output speed of the input and output shafts of a gear box.

The planetary gearboxes are built around three types of elements, the planetary gear, planet carrier and the main gear consisting of an outer ring gear or ring wheel and an internal sun gear or sun wheel. With this type of gearbox it is possible to split incoming torques onto several planet gears that are cooperating in transforming torque through the gearbox, between the ring gear and the sun gear.

The planetary gearbox can be made in many ways, but most usually as a single or a compound transmission gearbox. In single planetary gearboxes, a number of single planetary gears transform torque directly between the ring gear and the sun gear.

In compound planetary gear transmissions the torque is transmitted from the ring gear to the sun gear via a number of planetary gear sets, each planetary gear set comprising at least two planetary gears one of which is meshing with the ring gear and one of which is meshing with the sun gear. The planetary gears in each set may, in compound planetary gearboxes, either be in meshing contact with each other or, as in stepped compound planetary gearboxes, be fixed to each other by means of a common shaft. Such compound planetary gear arrangements can generate higher speed ratio than single planetary transmission gear boxes but these arrangement need very high machine tolerances not to wear out to fast.

The planetary gear box carrier can in some embodiments be connected to the transmission input/output shaft, and thus, with a fixed ring gear, transform torque through its rotating planetary gears to the sun gear and its connection to the output/input shaft. In other examples, the carrier may be fixed to the gearbox which in turn means that the ring gear is connected to the gearbox input/output shaft. The rotating ring wheel conveys thus torque through the fixed planetary carrier with its rotating planetary gears that transform torque to the sun gear that is connected to the output/input shaft.

It is extremely important with split transmission that the transforming of torque is evenly distributed onto the cog flanks that are involved.

With three planetary gears used in a single planetary gear box construction, the sun gear can be centred through the three planetary gear tooth flanks, and by physical and geometric reasons give possibilities to generate even force transmission distribution between the ring gear and sun gear. However these solutions are not so often used due to other problems.

In many planetary gear boxes, used for wind turbines, cars etc., three and even four planetary gears in as a compound first gear step are used often in such combinations that involved shafts and cog-wheels are milled an cut in one peas in extreme precision to try to ovoid over determination, that further limits the why how the total gearbox can be built and assembled—low logistic possibilities how to optimize assembly and how to make use of space in the whole gearbox transmission. This and further problems with over determinations often results in 3 or more gear steps are used to are used to convey incoming primary torque between the ring gear and sun gear into moderate gear ratio as e.g. 1:68

With three planetary gears in a single transmission gearbox it is possible with internal gearing of the ring wheel, to achieve a gear ratio of about 1:12. At this high gear ratio the sun wheels and its shaft will be disproportional in size and thus usually lower gear ratios are used in practice. With four planetary gears in a single planetary gearbox it may be possible to accomplish a gear ratio of about 1:5.2, with six planetary gears approx. 1:2.5 and with eight planetary gears approx. 1:2, before the planetary gears starts to hit each other.

PRIOR ART

U.S. Pat. No. 6,459,165 concerns wind power generation and discloses a two-stage planetary gearbox with three planet gears in each step. The rotating planet carrier of the first stage transmits torque through three planetary gears to a sun gear centred through the planetary gear tooth flanks. This sun gear conveys further the torque via a driving mean to rotate the planet carrier in the in a second step that trough three additional planetary gears transform tongue to a sun wheel attached to a shaft powering the generator at a total gear ratio of approximately 1:16. In other patens similar arrangements are further equipped with another planet gear stage and or fixed-axis gear systems to improve the gear rate and reduce the size, weight and cost of the generator. By such arrangements with three planet gears the first sun gear, the second planet carrier with its three planets and helical cut cogs will create free floating unit centred and stabilized by only the cog wheel flanks.

In theory, the above arrangement should not involve over determination problems but gravity may be a certain concern.

Another downside to use only three planetary gears in the first step is that a large primary torque only can be divided on to three pairs of cog wheel flanks which require large cog wheel diameters and sizes to cope with torque that is transformed over three planetary wheels and the sun wheel. The load onto the bearings will be high resulting in bearings having larger sizes and diameters that even can be larger than the gear itself, if not hydro mechanical plain bearings are used. Further, larger diameter ball or roller bearings reduce their tolerances to RPM according to an exponential function.

In other planetary gear boxes, used for wind turbines, cars etc, four planetary gears in 1-3 steps are used to convey incoming primary torque between the ring gear and sun gear. Splitting the incoming torque into 4 pathways through the gearbox will decrease the sizes of the gears and bearings but will also reduce the gear ratio to be about 1:4. Further, in these cases there are no possibilities to have a free floating sun gear. Instead, even load distribution is here sought to be achieved by increasing the precision in the manufacture of gears, shafts, bearings, centring, elasticity, etc.

In order to further minimize over determinations, gear shafts some times are equipped with a flex pin arrangement such as disclosed in U.S. Pat. No. 3,303,713.

Single step planetary gear arrangements comprising four planetary gears allow, due to geometrical reasons, gear ratios at a maximum of about 1:5.2 and in practice usually a gear ratio of 1:4 is achieved. When arranged as a two step gear arrangement this will give a gear ratio of 1:16. In order to improve the gear ratio and reduce the size of the driven generator a third planetary gear stage may be added such as disclosed e.g. U.S. Pat No. 8,907,517. In other known arrangements, a third gear step may be arranged as a fixed axis gear system that also solves the other big issue in gear trains concerning wind power to have a central open contact through the hole in central shaft for power support and control of the wind turbine.

Compound planetary gearboxes, sometimes referred to as hybrid stepped planetary solutions, have two linked planetary gears, a primary and a secondary, with different diameters, fixed onto one common shaft in one compound gear step. This arrangement transform torque with high theoretical gear ratio, but with consideration of other issues concerning the gearbox, the gear ratio with three pairs of linked planetary gears in practice will be in a region of 1:15 to 1:20.

Even though such compound stepped planetary gear arrangements theoretically exhibits great gear ratios, compact constructions, high energy densities and high speed ratios, the stepped planetary gears have not in practice been used to a large extend within e.g. the windmill industry. It has turned out that such known stepped gear arrangements frequently exhibits the following problems:

They require very precise machining and measurements to prevent over determination, due to double meshing contacts between two different gears with an exact fixation to one common shaft makes manufacturing and assembling more difficult and results in greater risks of failure.

Stepped planetary gears with four planets at the same level will reduce the gear rate and make this solution less attractive.

US 2010/0113210 A1 discloses a compound planetary gearbox where the secondary planet gears are stacked in two axial levels thus creating a split torque from an internally geared ring wheel to a central sun gear. The document discusses the problem of over determination but fails to suggest at a satisfactory solution usable for all embodiments described therein.

In U.S. Pat. No. 8,734,289 B2 a plurality of identically shaped first and second planet shafts equipped with a primary and a secondary planet gear that are stacked both in axial and with the second planet shaft in radial directions forming a sector to transform split torque from an external ring gear to a central sun gear. Smaller diameter gears will provide better machining and measuring conditions to achieve even flank pressures on the involved gears. The drawback is an extra gear step to achieve the same gear rate as e.g. is described in US 2010/0113210.

US 2003/0015052 A1 presents a gearbox with a plurality of identically shaped first, second and third planet shafts equipped with a primary and a secondary planet gear where the first and second planet shafts with their planets are stacked on both sides of an externally cut ring gear, forming two sectors with two first planet shafts that with their planet gears are meshed together with the planet gears of the second planet shaft and where these two sectors are mashed together with the third planet shaft and its planet gears to transform half of the torque generated by the ring gear as split torque to a driving shaft of an generator.

Stacking the second planetary gears in two levels improve the possibilities to achieve high speed ratios and double the split torque gear functions through the gearbox, but will result in that six, eight or more cogwheels in further different positions in the gearbox have to be secured to mesh with even cog-flank pressures.

At higher torques to be transmitted through the gearbox, at least one of the gears has to be fixated to the shaft by e.g. splines that further dramatically increase the risk of misalignment and create over determinations of one or many cog-flanks.

Larger cogwheels are difficult to measure and adjust to have exact masking parameters.

US 2010/0240490 A1 discloses a planetary gear unit. It comprises split planet gears with two sub gears of equal diameter which are mutually preloaded relative to each other by spring bars arranged parallel to the planetary axis of rotation. The arrangement is said to result in a backlash-free planetary gear unit.

A damage report concerning all Swedish windmills made by the Swedish Elforsk report 10:50 2011 and CIRP Annals—Manufacturing Technology 61 (2012) 611-634 concluded that the gearboxes generally not lasted longer than about half the promised service life of 20 years. The result shows that the gearbox designers fails to take all the internal dynamic forces into consideration.

U.S. Pat. No. 4,674,351 discloses a compliant gear. The document describes that earlier attempts to create compliant gears to be used for shock absorbance, reduced tolerances requirements between meshing gears and noiseless gears has failed due to lack of radial stiffness to maintain centreline distance between the meshing gears. The document suggests increasing the radial stiffness of the compliant gear by intrusion of rigid shim as sandwich construction between a compliant laminate. That was followed by other similar constructions like U.S. Pat. No. 4,831,897A or just by providing the gear with bendable sprockets inside cogwheel WO2007119074A1 or in a hub connected to the cogwheel as in DE102007053509A1.

Prior art in shifting gear rates using planetary gears can vary in many ways.

Using one gear set of planetary gears to create different gear rates is exemplified in U.S. Pat. No. 6,935,986B2 were the inventor have focused on how to add brakes and clutches to lock and release the involved ring gears planetary holder in efficient ways in order to create a two speed gearbox and one neural speed.

By adding brakes and clutches to two or more gear sets of planetary gears to lock and release the involved ring gears planetary holder and sun gears in different ways exemplified by the U.S. Pat. No. 9,482,318B2 Nov. 1 2016 and its references can serve as prior art of Simpson shifts.

U.S. Pat. No. 9,073538 B2 can serve as prior art to create, if wanted, a compound planetary gearbox with an additional gearbox to create two different gear ratios using the same electric motor.

SUMMARY OF THE INVENTION

An object of the present invention is to provide an enhanced compound stepped and/or stacked planet gear arrangement, with possibilities to arrange the gear arrangement for two or more gear rates an further also free-wheel possibilities within the gearbox due to is high freedom.

Another object is to provide such a compound planet gear arrangement which efficiently reduces the problems caused by over-determination, at a high degree of freedom allowing equal load distribution between pluralities of gears sharing the total load.

A further object is to provide such a compound planet gear arrangement having shock absorbing properties for reducing the negative effects of transient torque variations acting on the input shaft.

A still further object is to provide such a compound planet gear arrangement exhibiting a high gear ratio, high energy density and high speed ratio.

Yet another object is to provide such a compound planet gear arrangement which may easily be assembled and disassembled and which readily allows maintenance.

Still another object is to provide such a compound planet gear arrangement, which allows for that a wind turbine arranged to drive the gear box may be readily controlled in a space saving manner while requiring only small modifications of a limited part of a gear arrangement connecting the turbine to a generator.

Another object is to provide such a compound planet gear arrangement at which the dimensions of constituent components, such as sun wheels, may be kept small while still allowing optimal gear ratios.

Yet another object is to provide such a compound planet gear arrangement, which allows for that a composed gear arrangement forming a drive train may be readily assembled by combining modular components.

A further object is to provide such a compound planet gear arrangement, which is adapted to be used in windmills for efficient extraction of electric energy from heavily varying winds exhibiting large degrees of turbulent flows.

A still further objet is to provide such a compound planet gear arrangement which allows that an in- or outgoing shaft which is connected to or forms a sun wheel of the compound planet gear arrangement is radially supported.

Still another object is to make use of the great opportunities to support a hollow in/outgoing shaft arranged as a large flex pin shaft arrangement to protect the gear box from all kinds of lateral bending forces that can have negative effects on to the primary force transmitting ring gear, where the hollow flex pin shaft at one end is strongly journaled by large central bearings in the gearbox and at the other end is strongly journaled in its connection to the driving hub of the wind turbine and where the hub is heavily anchored to the body of the gearbox and nacelle.

Yet another object is to provide such a compound planet gear arrangement which allows that a shaft for the an in- or outgoing shaft connected to the ring gear of the compound planet gear arrangement can have hollow shafts that can be provided with electric wires, tubes, rods etc. e.g. for operating the pitches of the turbine blades.

According to a first aspect, the invention concerns a compound planet gear arrangement comprising; a housing enclosing an interior space; a first rotational in- or output shaft; a ring gear which is fixed or connectable to the first in- or output shaft; a sun wheel which is connectable to a second in- or output shaft; and at least two planet gear units. Each planet gear unit comprises a primary planet gear with primary planet teeth meshing with the ring gear and a secondary planet gear with secondary planet teeth meshing with the sun wheel. The secondary planet gear is axially connected with the primary planet gear by means of a planet shaft. The compound planet gear arrangement further comprises a structural body which is formed in one piece, arranged in the interior space and fixed to the housing. The structural body exhibits a number axial bores arranged to define the absolute and relative positions of respective bearings by which the first in- or output shaft and the planet shafts are journaled to the structural body.

The gear arrangement according to the first aspect allows for a very precise positioning of the rotational components of the arrangement. This in turn results in increased performance and prolonged service life. Additionally the arrangement of the structural body provide for that the material needed for achieving sufficient stability and support for the torque transmitting components may be reduced. Hereby the weight is reduced and the available space in the housing is increased, which in turn results in enhanced possibilities to freely design the torque transmitting components for achieving optimal performance for various applications.

According to a second aspect, the invention concerns a compound planet gear arrangement comprising; a first rotational in- or output shaft; a ring gear which is fixed to the first in- or output shaft; a first sun wheel which is connectable to a second in- or output shaft (250); and at least two planet gear units. Each planet gear unit comprises a primary planet gear with primary planet teeth meshing with the ring gear and a secondary planet gear with secondary planet teeth meshing with the first sun wheel the secondary planet gear being axially connected with the primary planet gear by means of a respective planet shaft. The gear arrangement further comprises a second sun wheel which is arranged coaxially about the first in- or output shaft and which is operatively connected to the primary planet gear (234, 334) of each planetary gear unit. A clutch arrangement is arranged for selectively connecting the ring gear or the second sun wheel to the first in- or output shaft for allowing altering the gear ratio of the gear arrangement.

By this means a flexible compound planet gear arrangement which allows for alteration of gear ratio is achieved in a simple and reliable manner.

According to a third aspect, the invention concerns a compound planet gear arrangement comprising; a first rotational in- or output shaft; a ring gear which is fixed to the first in- or output shaft; a first sun wheel which is connectable to a second in- or output shaft; and at least two planet gear units. Each planet gear unit comprises a primary planet gear with primary planet teeth meshing with the ring gear and a secondary planet gear with secondary planet teeth meshing with the sun wheel, the secondary planet gear being axially connected with the primary planet gear by means of a respective planet shaft. Each planet gear unit comprises at least two secondary planet gears having different diameters. Each secondary planet gear is connected to the respective primary planet gear by means of the respective planet shaft. The gearbox arrangement further comprises at least two sun wheels which sun wheels are aligned axially and connectable to a second in- out output shaft and which sun wheels mesh with respective secondary planet gears of all planetary gear units. A first clutch arrangement is arranged for selectively connecting either of the sun wheels to the second in- or output shaft, for allowing altering the gear ratio of the gear arrangement.

This planet gear arrangement provides an alternative means for providing the possibility of altering the gear ratio in a simple manner. It further allows for that freewheeling capabilities may readily be applied to the gear arrangement.

According to a fourth aspect, the invention concerns a gear wheel arrangement. The invention has been inspired by the design of cardiac muscles, where nature has managed the feat to ensure that all 4-10 billion to muscle cells can develop their optimum individual forces for performing their mechanical work, consisting of a shortening simultaneously with a thickening. It would not have been a problem to achieve this if the cardiac muscle only consisted of a single layer of muscle cells. However, it consists of thousands and thousands of layers which form the external and internal volumes of the heart. The muscle cells exert the mechanical work at constant volume. The maximum force is exerted when the cells assumes a maximum extended state. This means that the muscle cells, layer by layer, must be arranged so that they in no way, when being shortened and thickened, disturb adjacent layers in the radial direction.

According to the inventor, Nature has solved this by arranging the cells of the heart muscle in a logical manner such that they, with equal-sized, forces in a spiral -helix form may develop combined axial forces driving the piston-like cardiac pump function.

Gears have, just as the heart muscle cell, a constant volume, and it is very important that all cooperating cog flanks equally loaded to obtain a long service life.

In addition to that the invention concerns radial torsion, which prevents over-determination; it also concerns helical tooth flanks which can generate axial forces and movements. The radial torsion, together with axial torsion provides a helical torsion comprising axial forces and movements. These may thus be damped for absorbing undesirable shock loads and excessive torques in the gear box.

The gear wheel arrangement comprises a first part which is arranged to be rotationally fixed to a shaft and a second part which is rotatably connected to the fist part and provided with gear teeth for meshing with an adjacent gear. The first and second parts are mechanically connected by means of at least one first elastically deformable member which allows a limited relative rotation between the first and second part. The gear teeth of the second part are helical and the gear wheel arrangement is arranged to allow a limited relative axial displacement between the first part and the second part.

By allowing both circumferential and axial relative movement between the first and second part, the gear wheel arrangement provides high torsional compliance which, in addition, may be precisely controlled by providing and selecting suitable elastically deformable means for absorbing relative movement in either or both of the circumferential and axial directions. The gear wheel arrangement is very well suited for applications in the planet gear arrangements according to the first, second and third aspects of the invention.

At the first aspect:

The axial bores may comprises planet shaft bores for defining the positions of the bearings by which the planet gear shafts are journaled to the structural body, which planet shaft bores are arranged in pairs, each pair comprising a first and a second planet shaft bore which are axially aligned and axially separated.

The axial bores may comprises first in-or output shaft bores for defining the positions of the bearings by which the first in- or output shaft is journaled to the structural body, which first in- or output shaft bores may be arranged in pairs, each pair comprising a first and a second first in- or output shaft bores which are axially aligned and axially separated.

The structural body may comprise a first body portion and a second body portion which is axially separated from the first body portion by means of at least one axially extending distance portion.

The first body portion may comprise the first planet shaft bores and a first in- or output shaft bore and the second body portion may comprise the second planet shaft bores.

The second body portion may comprise a second in- or output shaft bore.

The first body portion may be arranged at an axial centre region of the interior space.

The second body portion may be arranged in proximity to an axial end wall of the housing.

The housing may comprise a number of modular housing components which are arranged to be assembled sequentially one to the other from the first body portion and outwardly in both axial directions.

The housing may comprise an axial end wall which exhibits a number of end wall bores, each end wall bore being aligned with the first and second planet shaft bores of a respective pair and arranged to receive an additional bearing for journaling the respective planet shaft to said end wall.

The compound planet gear arrangement may comprise at least one annular insert which is insertable in and removable from a corresponding of said bores, for fixation of a respective bearing to the structural body when inserted and for enhancing access through the bore when removed.

The housing may comprise a first shaft opening arranged in a first axial end wall and receiving the first in- or output shaft and a second shaft opening arranged in a second end wall and receiving the second in- or output shaft.

Each planet gear unit may comprise a transmission arrangement which is arranged to allow a limited elastic rotation of the secondary planet teeth relative to the primary planet teeth.

At the second aspect:

The second sun wheel may be operatively connected directly to the primary planet gears by meshing with these primary planet gears.

The second sun wheel may be operatively connected indirectly to the primary gears via intermediate gears, each of which intermediate gears meshes with the second sun wheel and with a respective primary gear.

The second sun wheel may be fixed to a sleeve member which coaxially receives a portion of the first in- or output shaft.

The ring wheel may be journaled by bearings to the sleeve member.

The sleeve member may be journaled in bearings to a structural body and the first in- or output shaft may be journaled in the sleeve member by means of additional bearings.

The clutch arrangement may comprise an engagement member which is rotationally fixed to the first in- or output shaft and arranged to be axially displaced between a first engagement position where it engages the ring wheel or a member fixed thereto and a second engagement position where it engages the second sun wheel or a member fixed thereto.

The engagement member may be displaceable to an intermediate position where it does not engage the ring wheel the second sun wheel or any member fixed thereto for allowing free spin of the first in- or output shaft by disconnecting it from the ring wheel and the second sun wheel.

The secondary planet gears may have a larger diameter than the primary planet gears.

Each planet gear unit mat comprise a transmission arrangement which is arranged to allow a limited elastic rotation of the secondary planet teeth relative to the primary planet teeth.

At the third aspect:

The first clutch arrangement may comprise a first engagement member which is rotationally fixed to the second in- or output shaft and axially displaceable between a first engagement position where it engages a first of said sun wheels and a second engagement position where it engages a second of said sun wheels.

The first engagement member may be axially displaceable to an intermediate position where it does not engage either of the sun wheels.

The first engagement member may comprise a hollow sleeve member which receives the second out- or input shaft and which is rotationally fixed thereto by means of splines.

The sun wheels may be journaled to the second in- or output shaft.

The compound planet gear arrangement may comprise a second clutch arrangement for selectively connecting and disconnecting the ring wheel to and from the first in- and output shaft.

The second clutch arrangement may comprise a second engagement member which is rotationally fixed to the first in- or output shaft and axially displaceable between a an engagement positon where it engages the ring wheel and a disengagement position where it is disengaged from the ring wheel.

The second engagement member and the ring wheel may comprise cooperating engagement means for allowing form-locking engagement when the engagement member assumes its engagement position.

The ring wheel may comprise a radially inner and axially extending hub portion, which hub portion coaxially receives the second engagement member.

The hub portion may be journaled to a structural body of the compound plant gear arrangement.

The secondary planet gears may have a larger diameter than the primary planet gears.

Each planet gear unit may comprise a transmission arrangement which is arranged to allow a limited elastic rotation of the secondary planet teeth relative to the primary planet teeth.

At the fourth aspect:

The gear wheel arrangement may comprise at least one first elastically deformable member which is deformed during relative rotational displacement between the first part and the second part.

At least one first elastically deformable member may be arranged to be deformed during relative axial displacement between the first part and the second part.

The gear wheel arrangement may, comprise at least one second elastically deformable member, which is arranged to be deformed during relative axial displacement between the first part and the second part.

The gear wheel arrangement may comprise at least one bearing arranged between the first part and the second part for reducing the friction between the first and second part during relative rotation.

The first part may comprise a central hub with an axial bore for receiving the shaft and at least one first contact member which is arranged at a radial distance from a central axis of the hub; wherein the second part comprises a annular toothed member with peripheral helical teeth and at least one second contact member; and an elastically deformable member may be arranged between said first and second contact members.

The first part may comprise a radial disc which extends radially from the hub and which carries a number of first contact members extending axially from the radial disc, wherein the second part comprises at least one carrier disc which is fixed to the toothed member and which exhibits a corresponding number of recesses and an annular elastically deformable member may be received in each recess and about each first contact member.

The second part may comprise two carrier discs arranged at opposite axial sides of the radial disc.

The gear wheel arrangement may comprise adjustment means for adjusting the nominal relative rotational position between the gear teeth of the second part and the shaft.

The at least one first elastically deformable member may comprise a polymer material.

The at least one first elastically deformable member may comprise a torsional spring.

The following passages generally apply to the different aspects of the invention. The secondary planet gear may have a larger diameter than the primary planet gear which results in that the gear units per se constitute a gear step within the compound planetary gear arrangement. Thereby the compound planetary gear arrangement provides three gear steps. A first gear step corresponds to the difference in diameter between the ring gear and the primary planet gears. A second gear step corresponds to the difference in diameter between the primary planet gears and the secondary planet gears. A third gear step corresponds to the difference in diameter between the secondary gear steps and the sun wheel. By this means the compound gear arrangement may readily be designed with comparatively high total gear ratios. Additionally, such high total gear ratio may be accomplished in a space and weight saving manner. The additional second gear step also increases the degree of freedom when selecting a desired total gear ration for the entire compound gear arrangement The gear arrangements may preferably be provided with a transmission arrangement which allows an elastic relative rotation between the primary planet gear and the secondary planet gear. By this means heavy rotational accelerations and retardation of one of the planet gears is smoothly absorbed by the other planet gear, thereby preventing heavy impacts when one cog flank comes into contact with a corresponding cog flank of the meshing gear.

When used e.g. at windmill installations, winds with heavily varying forces and with turbulent flows causes the rotational speed of the rotor to vary momentarily. This in combination with the momentum of the gear arrangement and a generator connected thereto will continuously cause cog teeth of one gear to be forced into high frequently altering contact with neighbouring cog flanks of two cog teeth at a meshing gear. The anti-over-determined and shock absorbing transmission arrangement efficiently reduces the impact of such altering contact and prevents heavy rotational accelerations and retardations on the input shaft to be transmitted to gears arranged downstream of the transmission unit.

In addition to the shock absorbing effect, the transmission units also greatly reduces the problems caused by over determination of split torque transmission in planetary gears. Since the secondary planet gears may be limitedly and elastically rotational relative to their respective primary gear, each secondary gear may individually adjust its engagement with the sun wheel such that the total load of the gear arrangement is evenly distributed between all cooperating cog flanks momentarily being in engagement.

By this means, the compound planet gear and its constituent parts may be designed with comparatively small dimensions while still being able to withstand high and greatly momentarily varying torques. This in turn allows for that the compound planet gear may be designed with high energy density, high gear ration and high speed ration. The load distributing effect of elastic transmission arrangements also reduces the wear of all cog flanks involved in transferring torque through the compound planet gear, thereby greatly enhancing the service life of the entire arrangement.

The transmission arrangement may also be understood as a compliant gear, which is arranged to be used for shock absorbance, for reducing the required tolerances between meshing gears and splines and for reducing noise in such a way that the radial stiffness is not jeopardized even though the possible compliance functions in this transmission arrangement is comparatively much higher than in previously known compliant gears. The high compliance functions are well adapted to be used in compound stepped and stacked planetary gearboxes and will in e.g. a drive train consisting of two stepped and stacked compound gearboxes, due to the high speed ratio generate very high compliance characteristics between the input and output torque in the drive train. If these gear arrangements are used in windmills they will to a large extent smooth and even prevent the change in torque directions that often occurs between the turbine, rotor or propeller and the generator during e.g. turbulent winds.

It should be noted that satisfying shock absorbing properties of the transmission arrangement requires that the transmission arrangement is arranged to allow a certain minimum elastic relative rotation between the primary and secondary planet gears. This is necessary for the transmission arrangement to be able to reduce the retardations and accelerations caused by heavily fluctuating torques on the input axle. It has proven that the transmission arrangement should preferably be arranged to allow an elastic relative rotation of at least one degree and preferably between two and four degrees when the intended maximum torque for the compound planet gear arrangement is applied.

Preferably the elastic members are arranged at the at the secondary planet gear which has a larger diameter than the primary planet gear. By this means it is possible to reduce the forces which need to be absorbed by the elastic members. Since the secondary planet gear has a larger diameter than the primary planet gear it is possible to arrange the elastic member at a longer distance from the rotational axis than if the elastic members were arranged at the primary planet gear or at a planet shaft axially connecting the primary and secondary planet gears. By increasing this distances any torque transmitted between the primary and secondary planet gear will result in a correspondingly reduced force acting on the elastic members such as a e.g. a polymer bushing or a mechanical spring arrangement. This allows for a higher degree of freedom when choosing the material properties of the elastic members and reduces the space requirements as well as prolongs the service life of the elastic members.

Each transmission arrangement may comprise a drive disc which is fixed to a planet shaft connecting the primary planet gear with the secondary planet gear and which is provided with a number of axially extending pins fixed to the drive disc; and a cog wheel member provided with peripheral teeth and comprising one or two transmission disc provided with a number of openings corresponding to the number of pins, wherein an annular elastic member is received in each opening and a respective pin is received in each elastic member.

In such case the peripheral teeth of the cog wheel member may form the secondary planet teeth and the drive disc may be non-rotationally fixed to the primary planet gear by means of a planet shaft.

Advantageously, the flex planet gear arrangements may, together with its bearings form a planet gear flex module. Such a module may readily be mounted and de-mounted as a single component.

The planet gear module may further comprise at least one bearing hub for fixation of a bearing to a main body or housing of the compound planet gear arrangement.

Each elastic member may comprise an annular rubber bushing.

Each elastic member may further comprise an inner metallic sleeve and an outer metallic sleeve.

The compound planet gear arrangement may be a stacked planet gear arrangement comprising an even number of planet gear units with the primary planet gears arranged in a first radial plane and wherein half of the secondary planet gears are arranged in a second radial plane and half of the secondary planet gears are arranged in a third radial plane being arranged at a greater distance from the first radial plane than the second radial plane.

In cases where the compound planet gear arrangement is not stacked, it may comprise an even or uneven number or planet gear units.

The transmission arrangements may be arranged to allow the limited elastic rotation equally in both rotational directions. By this means, the compound planet gear arrangement will be able to absorb heavy fluctuations of the torque applied to the incoming shaft and of the load applied to an outgoing shaft equally well when the compound planet gear is driven in both rotational directions. Additionally, the compound planet gear arrangement will be able to absorb heavy retardations and accelerations equally well when driven in either rotational direction The elastic members may be non-preloaded or equally preloaded in both rotational directions. This applies particularly to each of the elastic members of a single planet gear unit when seen alone. When several planet gear units are mounted to form the compound planet gear arrangement it may at some applications such as precise positioning be desirable to create a certain overall preload between cog flanks acting in opposite rotational directions. It is then possible during mounting to angularly adjust the different planet gear units, such that the elastic members of half of the number of the planet gear units are somewhat preloaded in one rotational direction while the elastic members of the remaining half of the planet gear units are equally preloaded in the other rotational direction. Such overall preload of the compound planet gear arrangement should however be kept comparatively low since such preload will compress the elastic members and thereby reduce their shock absorbing capability to a corresponding degree. It should also be noted that any such overall preload of the compound planet gear arrangement will increase the load on the cog flanks. Thereby it is necessary either to reduce the maximum torque that can be transmitted by the compound planet gear arrangement or to increase the dimensions of the participating gears and bearings or alternatively to increase the load bearing capability of the cog flanks.

A drive train arrangement may comprise a first compound planet gear arrangement as described above forming a first gear step and a second compound gear arrangement as described above forming a second gear step of the gear arrangement.

The sun wheel of the first compound planet gear arrangement may then be connected to the ring gear of the second compound gear arrangement.

The sun wheel of the second compound planet gear arrangement may further be connected to a rotor of an electrical generator, a motor or another utility appliance.

Alternatively, the drive train arrangement may comprise more than two compound planet gear steps, wherein the last gear step comprises a sun wheel which is connected to a generator, a motor or another utility appliance.

By connecting a generator, a motor or another utility to the sun wheel or alternatively replace the sun wheel in the gearbox with a corresponding cogwheel already being a part of the utility, results in that the shaft of the utility being connected to or comprising the sun wheel will be radially supported in multiple directions by the secondary planet gears meshing with the sun wheel. For example at a compound planet gear comprising three planet gear units the sun wheel will be radially supported in three directions. Correspondingly, at a stacked compound planet gear arrangement comprising six or eight planet gear units the sun wheel is supported in a corresponding number of radial directions. This provides great advantages in that it reduces the radial load on the connected utility and is particularly advantageous at high speed applications. Especially, such radial support greatly enhances the service life of the utility and any additional bearings comprised in the utility.

The drive train arrangement may comprise a housing which is divided into at least a first compartment receiving the first compound gear arrangement and a second compartment receiving the second compound gear arrangement, wherein the compartments are sealed from each other, for allowing different lubrication media to serve the respective compartments.

At least one of the first and second compartments may be divided into at least two sub-compartments.

The architecture of the gearbox with free space and volume in the centre of the gearbox in relation to its ring wheel can be used for strong and rigid bearing support to withstand strong radial and axial forces applied on to the . in- or output shafts in to and out of the gearbox This space and volume can also be used to by applying an extra sun wheel and a clutch to prepare each gear step with a dual shift in gear rate. A gear train with two gear steps gives possibilities to get 4 gear rates and so forth further being described in relations to the figures.

In drive trains concerning windmills the free space of volume filled with suitable bearings can be used to support a flex pin arrangement that can absorb axial, radial and bending forces from the mounting disc of the propeller and thus secure that the gearbox only is loaded with torque forces. In this case a drive train arrangement may comprise an input shaft which comprises a first tubular shaft member which is connected to the ring gear of the first compound gear arrangement and a shorter or longer second tubular shaft member which is arranged co-axially around the first tubular shaft member and fixed to the first tubular shaft member by means of an annular mounting disc, wherein the second tubular shaft member is journaled in bearings to the housing of the drive train arrangement.

The first tubular shaft member may be comparatively weak and arranged mainly to transmit torque from the mounting disc to the ring gear of the first compound gear arrangement and the second tubular shaft member may, together with the housing , be arranged to absorb axial, radial and bending forces from the mounting disc.

This provides great advantages in that an input or output shaft connected to the drive disc will be stably supported in the radial and axial directions merely by being connected to the drive train arrangement.

By this means the need of arranging additional bearings or other support structures outside of the drive train arrangement is reduced, which in turn reduces the space requirements and costs when utilising the drive train at various applications.

The arrangement of a tubular or hollow shaft further allows for that the interior space of this shaft may be utilized to accommodate portions of the external utility connected to the shaft, such as couplings and the like. This also contributes to reduce the space requirements of the total installation.

A turbine, such as a wind turbine, may be fixed to the mounting disc.

In the drive train arrangement, the first compound planet gear arrangement, the second compound planet gear arrangement and, when applicable, the generator and the input shaft may be arranged as separate modules which are arranged to be modularly assembled and de-assembled, module per module.

In order to utilize the RPM of the generator at its best efficiency rate e.g. the second modular gear arrangement according to the invention can be equipped with arrangements for high and low gear steps.

The drive train arrangement may comprise control means such as electrical wires and/or pipes for conducting controlling fluids, for controlling a turbine mounted to the mounting disc which control means extends from the first gear step or another gear step that can travel, axially through the first and other tubular shaft members of the input shaft to the mounting disc.

In drive trains concerning vehicles the free space of volume filled with suitable bearings can, inside the gearbox, be used to support the first part of the CV joint of a driving shaft of a vehicle wheel to allow the driving shaft to be as long as possible in a direct drive transmission where the weight of the wheel should be as low as possible. In vehicles like entrepreneur machines, tanks etc. a mounting plate can be supported by suitable strong bearings inside the gearbox to withstand axial, radial and bending forces affecting the wheel.

A well-known fact is that electric motors or generators at high RPM can have high power to weight ratio and have often their maximum efficiency at about half of its nominal trust.

The option to use the free space and volume at the ring wheel side of the invented anti over determination and shock absorbing gearbox is to equip the gearbox with an extra sun gear and a clutch to achieve a low and high gear ratio step transmission with the same features of the gearbox. That can be very useful in e.g. electric driven vehicles. They often need high torque, high gear ratio, on to the wheels during heavy work but lower trust, low gear ratio, and higher speed during transportation from A to B.

With a custom design overall gear ratio and a shift in gear ratio there can be an optimization of the electric motor size together with an optimization of its average efficiency rate.

The change in gear rate in this invented gearbox will work together with electronic sensors and control units that have impacts on to the electric motor controlling its speed and its rotating direction. For instance in a vehicles with e.g. four direct driven wheels and gearboxes with high and low gear steps and a neutral arrangement with no connection to the gearbox and electric motor one mode at high speed and lower trust can be that the two rear motors can be set at high torque but will be at higher speed be realised in a neutral position and thus hand over to the front motors set in a high speed mode for an energy saving driving.

Further objects and advantages of the compound planet gear and the gear arrangement appear from the following detailed description of embodiments and from the appended claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

In the following, exemplifying embodiments of the invention will be given with reference to the attached drawings, in which.

FIG. 3b is an exploded sectional view showing parts thereof, FIG. 3c is a corresponding elevational view and FIG. 3d is a section illustrating a detail thereof in enlarged scale.

FIG. 8a is a perspective view showing an embodiment of a gear wheel arrangement according to an aspect of the invention. FIG. 8b illustrates a section perspective and FIG. 8c illustrates an exploded view of the gear wheel arrangement shown in FIG. 8a.

DETAILED DESCRIPTION OF EMBODIMENTS

FIG. 1a-c and 2 illustrate schematically a compound planet gear arrangement according to the first aspect of the invention.

Figure 1A:
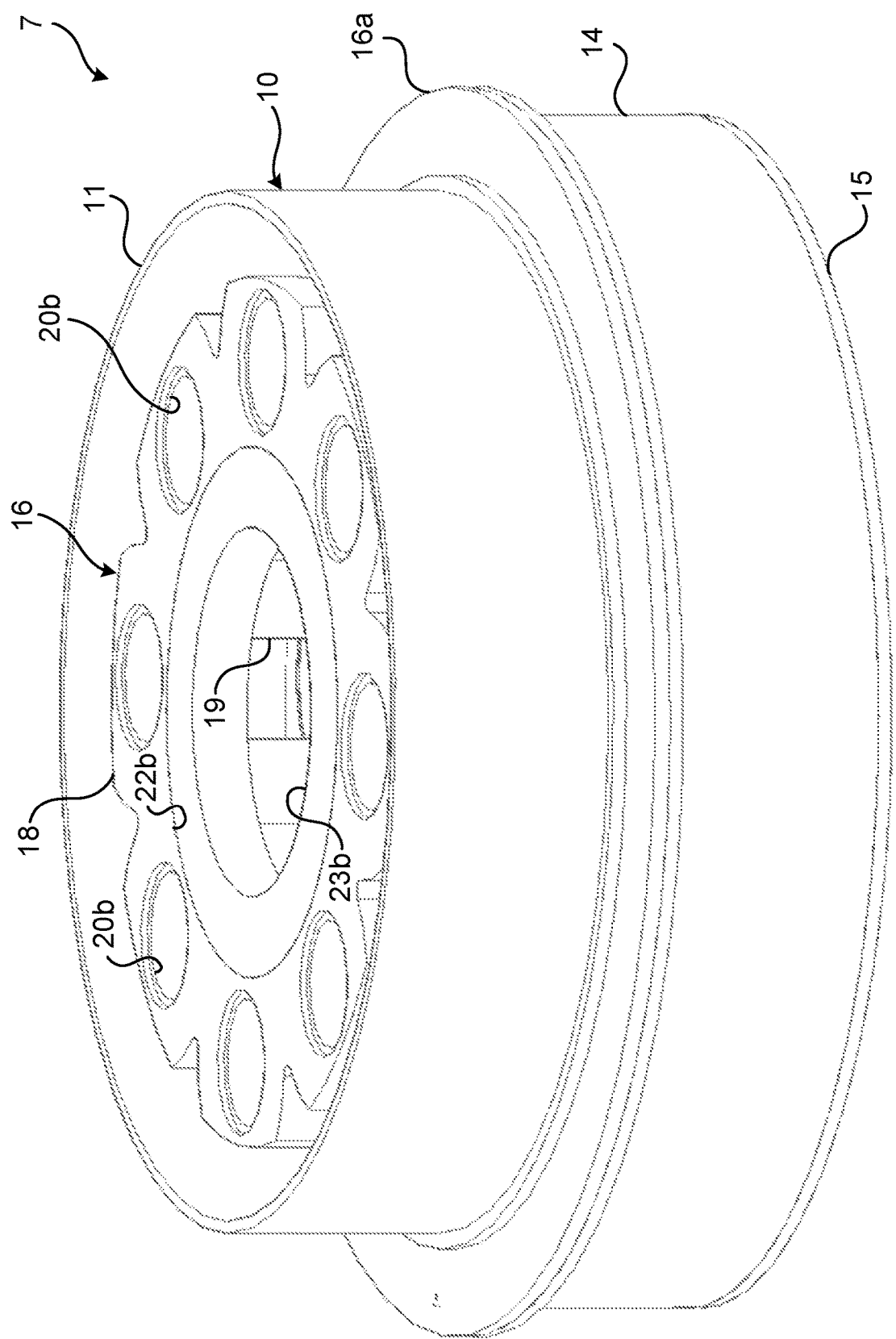
FIG. 1a is a perspective view of a compound gear arrangement according to an embodiment of the invention, where certain components of the gear arrangement have been removed.
Figure 1B:
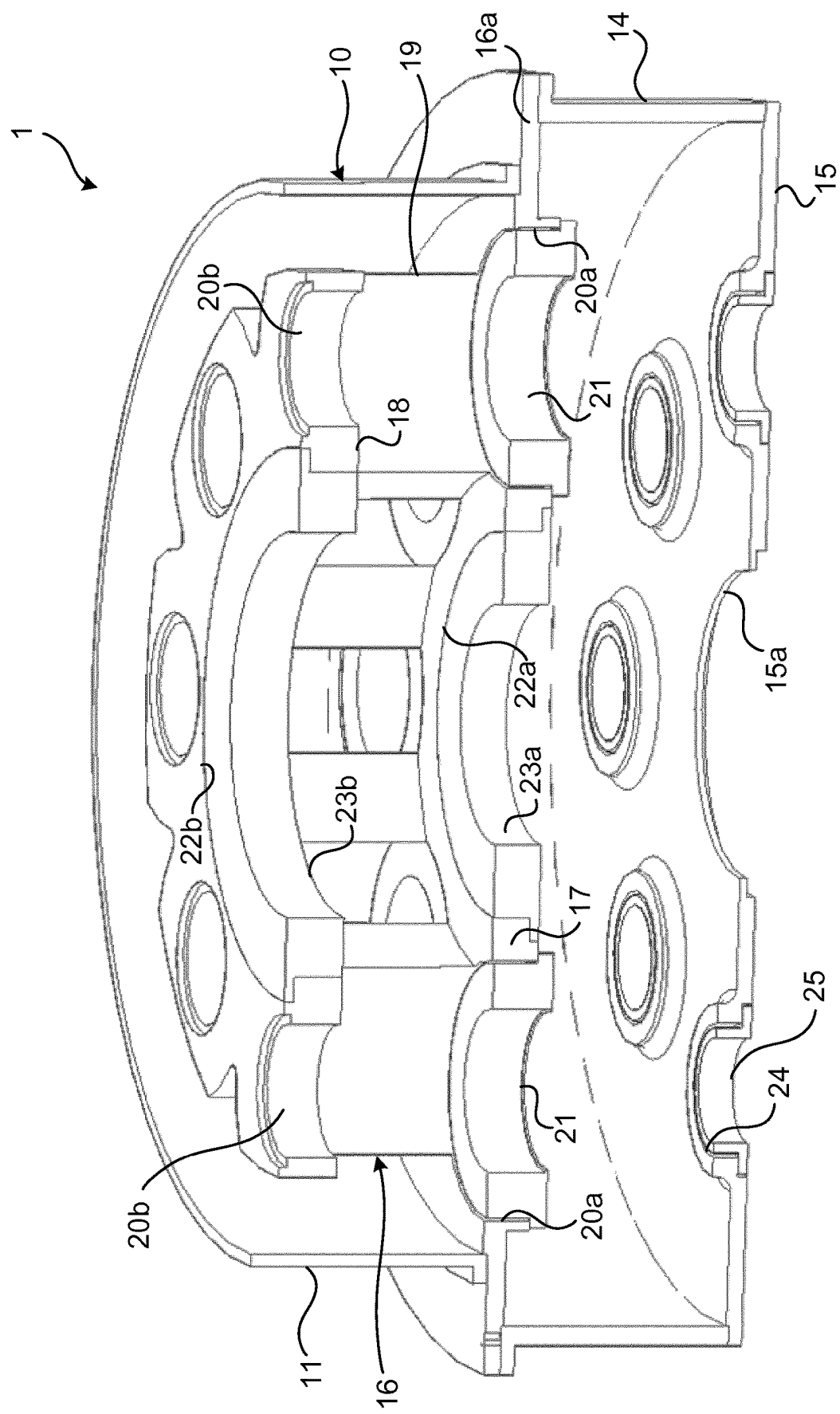
FIG. 1b shows a section in perspective view of the arrangement shown in FIG. 1a and FIG. 1c shows and exploded perspective view thereof.
Figure 1C:
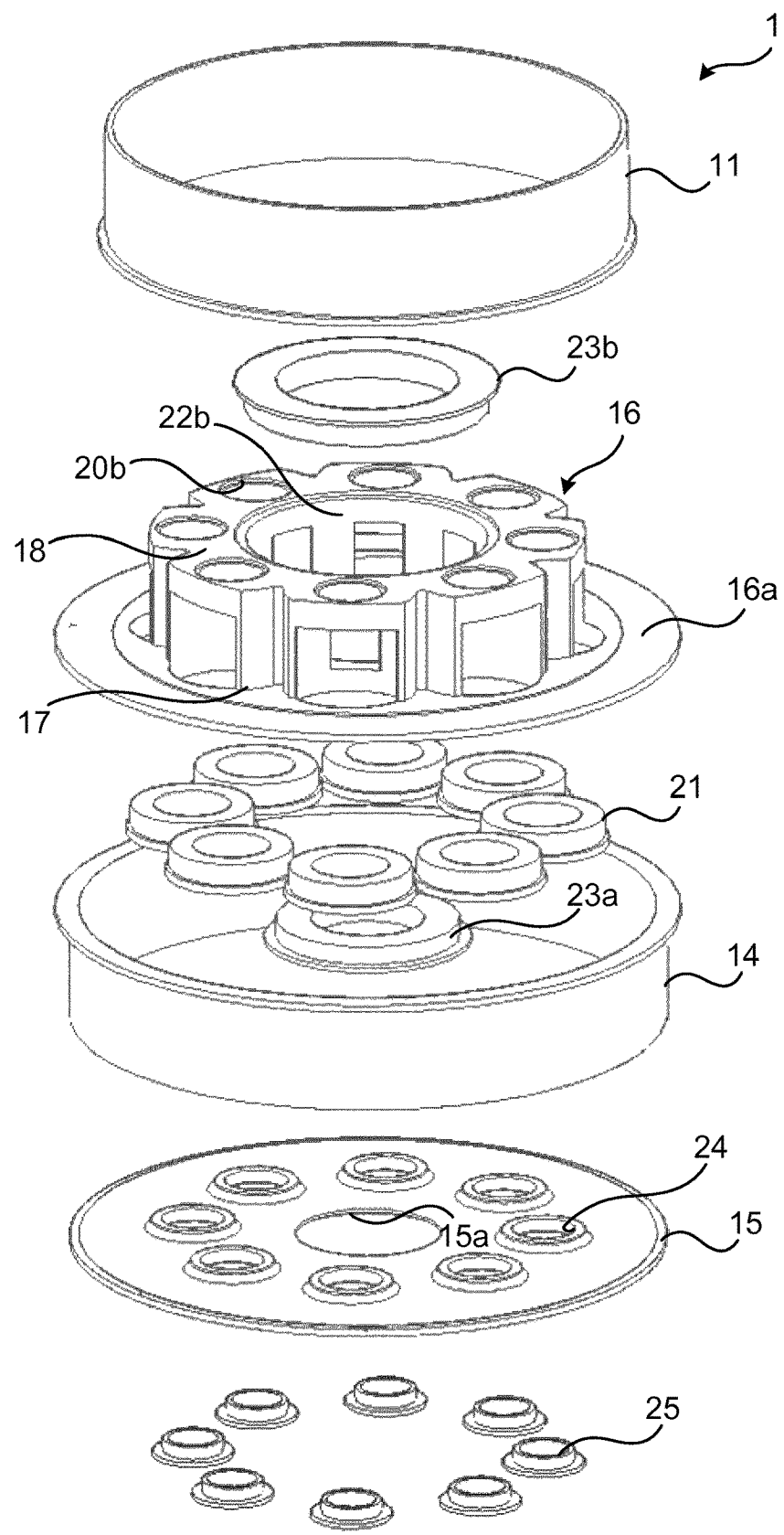

FIG. 1a-c show some structural components of an embodiment of the gear arrangement according to the first aspect of the invention. In FIG. 1a-c the rotational planet gear components have been removed for increased clarity. Thus, even though not shown in FIGS. 1a-c, the gear arrangement 10 according to this embodiment comprises a central first in- or output shaft which is fixed to a ring gear and eight planet gear units. Each planet gear unit comprises a planet gear shaft, a primary gear meshing with the ring gear and a secondary gear which meshes with a sun wheel connected to a second in- or output shaft.

As shown in FIGS. 1a-c, the gear arrangement 10 also comprises a housing 10, which comprises a number modular housing components which are arranged to be assembled sequentially one to the other from the axial centre of the gear arrangement outwardly in both axial directions. These modular components comprise a first end cap 12 which includes a cylindrical wall and a first end wall, which has been removed in FIGS. 1a-c and which exhibits a central access opening which receives a removable mounting disc with a first shaft opening, through which the first in- or output shaft extends when mounted. The housing further comprises a second end cap 14 with a removable circular second end wall 15 which exhibits a second shaft opening 15a through which a second in- or output shaft (not shown) extends when mounted. The first 11 and second end caps 14 are mounted to a radial flange 16a of a structural body 16 which is arranged in the interior space enclosed by the housing 10. The structural body 16 is formed in one piece, typically by casting and is machined for precise positioning and fixation of the rotational gear components. The structural body 16 comprises a first generally disc-shaped body portion 17 and a second generally disc-shaped body portion 18. The first 17 and second 18 body portions are axially separated by means of a number of axially extending distance portions 19. In the shown example the distance portions 19 are joined to form and a generally annular integral distance portion. The distance portions may however in some embodiments be separated from each other.

The structural body 16 exhibits a number of axial planet shaft bores 20a, 20b. The planet shaft bores are arranged in pairs each pair comprising a first planet shaft bore 20a arranged in the first body portion 17 and a second planet shaft bore 20b arranged in the second body portion 18. The planet shaft bores 20a, 20b of each pair are axially aligned and arranged at an axial distance corresponding to the distance between the first 17 and second 18 body portions. Each first planet shaft bore 20a is arranged to define the position of a first bearings by which a respective planet shaft is journaled to the first body portion of the structural body 16. Each second planet shaft bore 20b is, in a corresponding manner, arranged to define the position of a second bearing by which the respective planet shaft is journaled to the second body portion 18. A first annular insert 21 is received in each first planet shaft bore 20a. The first annular inserts 21 allows for that a planet gear unit comprising a primary gear, which has a diameter that is larger than the dimeter of the lower planet shaft bearings may be introduced from beneath through the first planet shaft bore 20as. After insertion of the primary gear between the first 17 and second 18 body portions the insert 21 may be inserted to the first planet shaft bore 20a such that a corresponding planet shaft bearing is received in the insert and thereby fixed in position to the structural body.

The first 17 and second 18 body portions each exhibits a first in- or output shaft bore 22a, 22b for precise positioning of first and second bearings respectively, by which the first in- or output shaft is journaled to the structural body 16. In the shown example, both first in- or output shaft bores 22a, 22b receives a respective annular insert 23a, 23b. When these annular inserts 23a, 23b are removed, the large first in- or output shaft bores 22a, 22b enhances access to the central portion of the gear arrangement to such that the assembly, de-assembly and maintenance is greatly facilitated. The inner diameters of the annular inserts 23a, 23b are chosen such that the first in- or to output bearings are precisely positioned and securely fixed to the structural body when received in the annular inserts. In the shown example, both first in- or output shaft bores 22a, 22b with annular inserts 23a, 23b are arranged to receive a respective first in- or output shaft bearing. At some embodiments however it suffices that only the lower first in- or output shaft bore 22a receives a first in- or output shaft bearing, with or without an annular insert 23a. At such embodiments the central bore arranged in the upper second body portion 18 may be used for positioning and fixation of other components of the gear arrangement. It should be noted however that preferably, the central bore of the first centrally arranged body portion should always constitute a first in- or output shaft bore for receiving a first in- or output bearing. This is the case since the first body portion 17 is arranged at a comparatively large axial distance from the axial ends of the housing such that it is allowed to position this first in- or output shaft bearing at a great axial distance of any other first in- or output shaft bearing arranged inside or outside the housing. The great axial distance between two first in- or output shaft bearings results in a very stable and secure fixation of the first in- or output shaft which in turn reduces radial movements of the first in- or output shaft and the further gear components.

Figure 5:
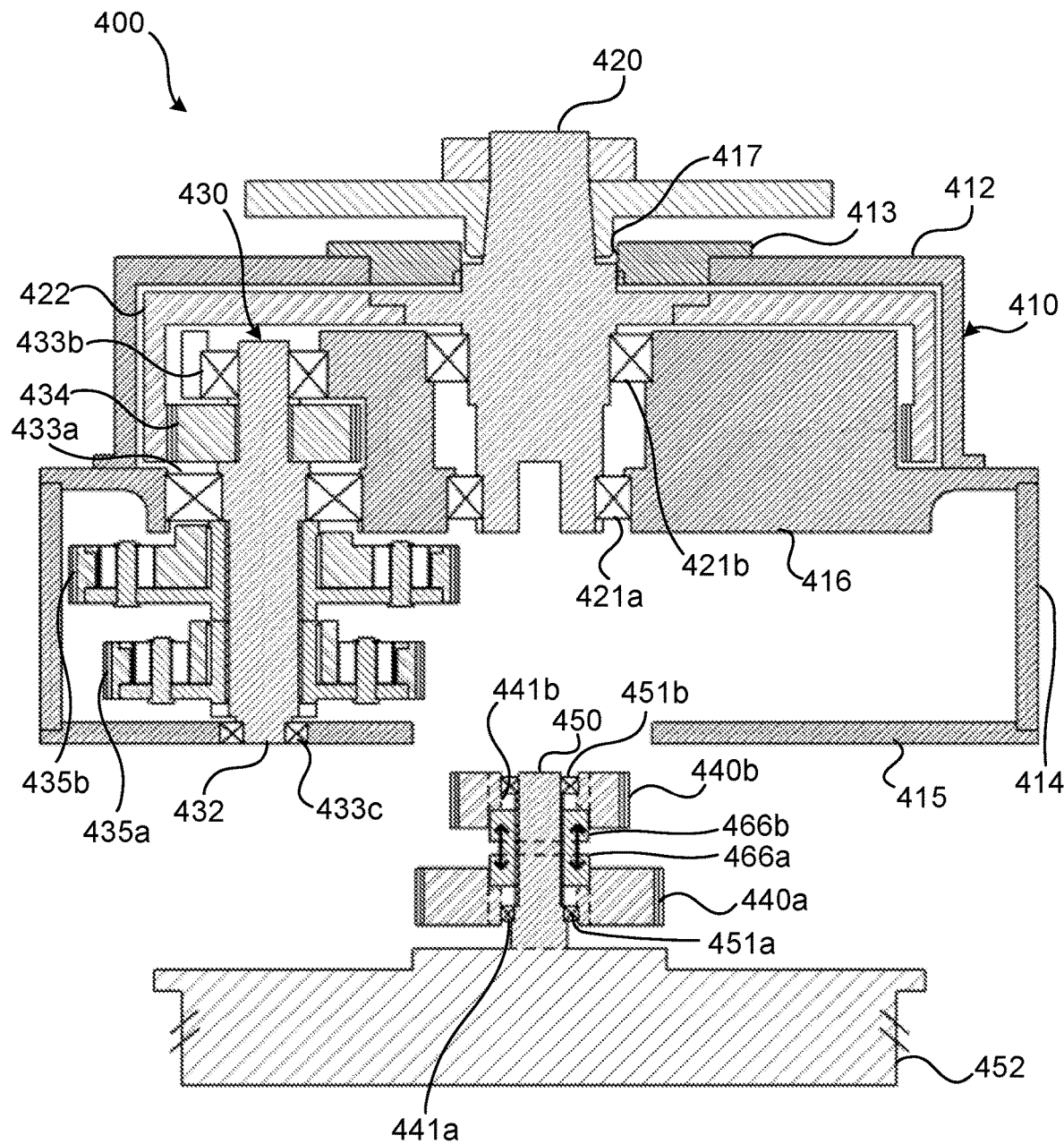
FIG. 5 is a partly exploded section illustrating a gear arrangement according to a fifth embodiment.
Figure 6:
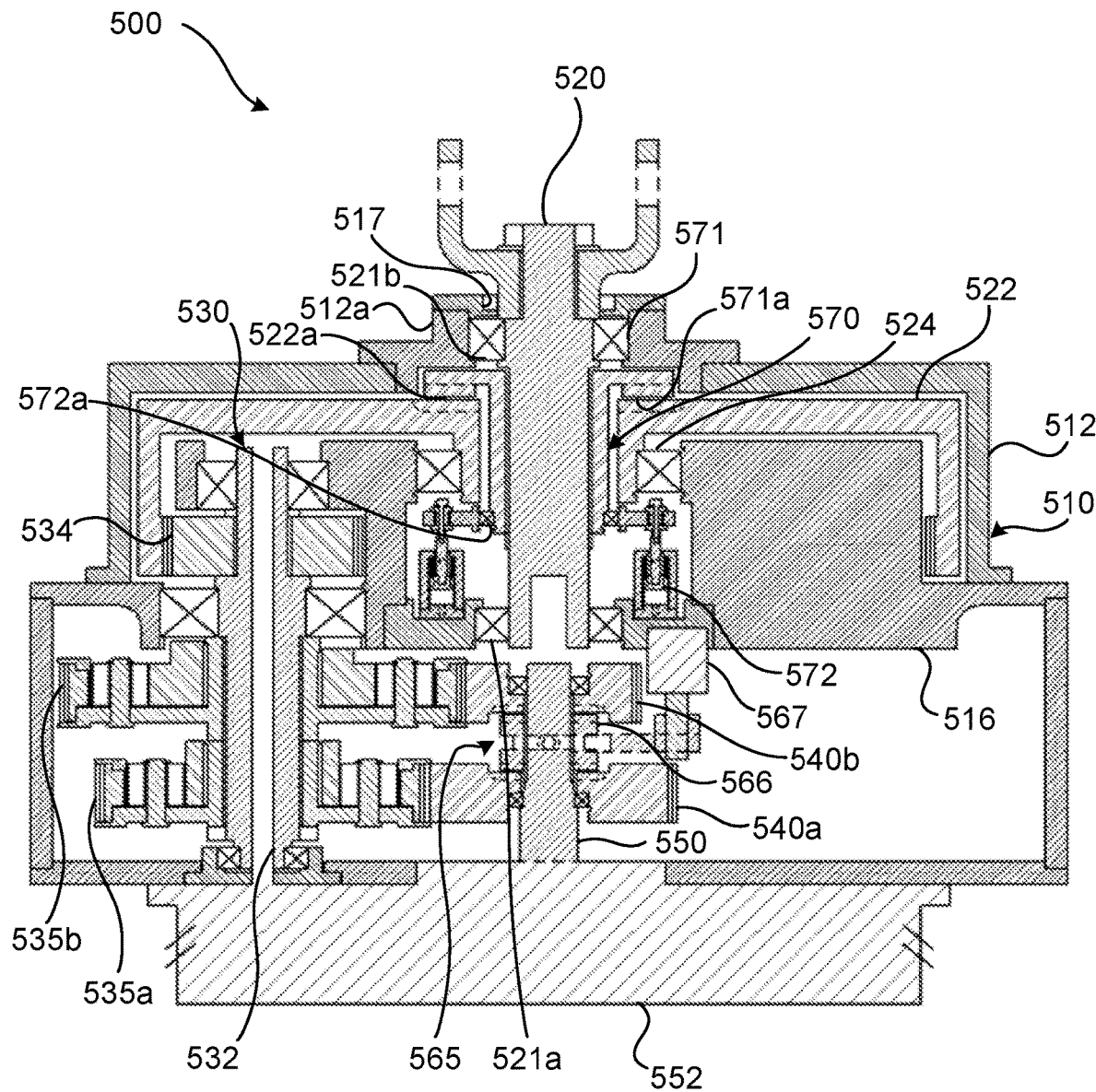
FIG. 6 is a section illustrating a sixth embodiment of the gear arrangement.

In the shown example the second axial end wall 15 exhibits a number of end wall bores 24 which number corresponds to the number of pairs of planet shaft bores 20*a*, 20*b*. An annular insert 25 is received in each end wall bore 24. Each end wall bore 24 with annular insert 25 is arranged to position and fixate a third planet shaft bearing which, at some embodiments of the gear arrangement, is arranged at the lower end of each planet shaft. Examples of such embodiments are shown in FIGS. 5 and 6. When mounting the planet gear shafts, the end wall 15 is removed and the planet gear shaft with upper planet shaft bearing and primary gear is introduced through the first planet shaft bore 20*a* as described above. When the upper planet shaft bearing has been received and fixated in the second planet shaft bore lob and the lower planet shaft bearing is received in the first planet shaft bore 20*a*, the annular insert 21 is threaded onto the lower bearing and introduced into the first planet shaft bore 20*a*. Thereby the entire planet gear unit has been precisely positioned with respect to the structural member 16 and secured thereto. Thereafter the secondary planet gears are threaded onto the respective planet gear shafts and fixated thereto. When this has been competed for all planet gear units, the end wall may be mounted such that the third planet shaft bearings are received in a respective end wall bore 24. Then the annular insert 25 is threaded onto the third planet shaft bearing and introduced in the end wall bore for a final fixation of the third planet shaft bearing.

The above described arrangement for positioning and fixation of the planet units and the first in- or output shaft and their bearings allows for that the positions of all so mounted components are defined by a single, one piece component, i.e. the structural body 16. All bearing seats and other guiding surfaces may thus be formed by machining a single work piece. By this means the accuracy in relative positioning between the components is greatly enhanced. This is an important advantage since even small deviations in relative positioning of the components may greatly reduce the load capability and service life of the gear arrangement. An additional important advantage of the above described arrangement is that the structural body 16 may be designed with minimum of material while still providing satisfying stability and load resistance. Hereby, the weight of the structural body 16 and the entire gear arrangement may be kept at a minimum at the same time as the available interior space within the housing may be increased. Also this later is an important advantage since it provides great possibilities to freely dimension the shafts, bearings, gears and other components for optimizing the performance such as the gear ratio, the load capability and the like.

Figure 2:
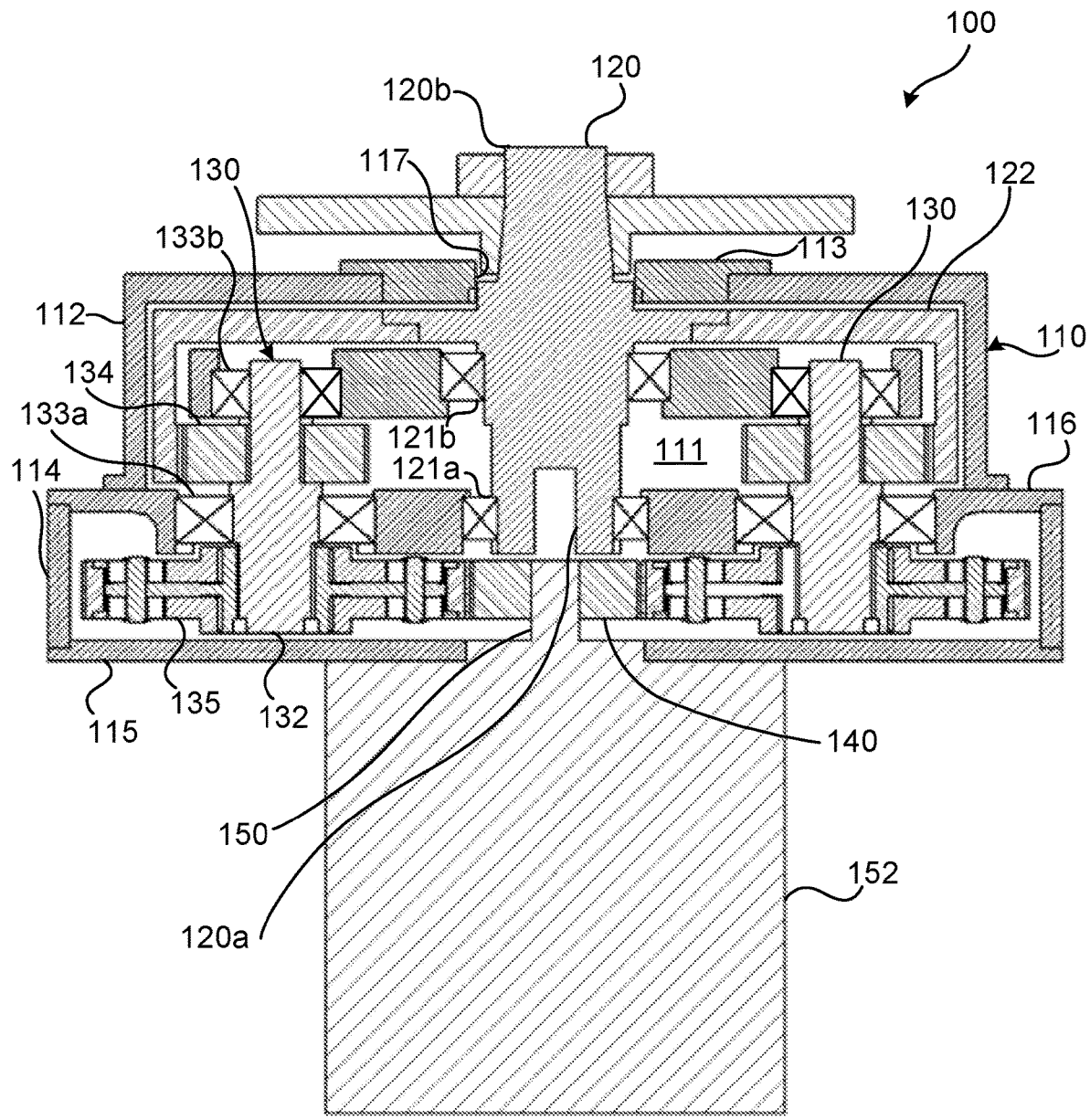
FIG. 2 is a section through a gear arrangement according to a second embodiment of the invention

In FIG. 2 a second embodiment of the invention is illustrated. The gear arrangement 100 according to this embodiment comprises a housing 110 which encloses an interior space 112. The housing is rotational symmetric with regard to a longitudinal centre axis and comprises a number of modular parts including a first end cap 112 with a centrally arranged mounting disc 113 and a second end cap 114 with a removable circular end wall 115. The first 112 and second 114 end caps are fixed to and enclose a structural body 116 such that the body 116 is at least partly arranged in the interior space 111.

A first in- or output shaft 120 extends through a first central shaft opening 117 arranged in the mounting disc 113 of the first end cap 112. The first in- or output shaft is journaled in central bearings 121*a*, 121*b* in the body 116. The central bearings comprise a first bearing 121*a*, which is arranged in proximity to a first end 120*a* of the in- our output shaft, which first end is arranged in the interior space 111. The first in- or output shaft 120 is also journaled to the body 116 by a second central bearing 121*b*, which is arranged at an axial distance from the first central bearing 121*a* in proximity to the first entrance opening 117.

The first in- or output shaft 120 is fixed to a ring gear 122 which rotates together with the first in- or output shaft 120.

The gear arrangement further comprises a number of planet gear units 130. In the shown schematic cross section, two such planet gear units are illustrated. The number of planet gear units may however be varied freely. Typically the gear arrangement comprises 2, 3, 4 or any number up to 8 planet gear units. In the following one of the plane gear units 130 is described and it is understood that all planet gear units are configured and arranged in the same manner. Each planet gear unit comprises a planet shaft 132 which is journaled in bearings 133*a*, 133*b* in the body 116. As seen in FIG. 1, the planet bearings comprises a first, lower bearing 133*a* which is arranged essentially at the same axial level as the first central bearing 121*a*. A second planet bearing 133*b* is arranged at an axial distance from the first planet bearing 133*a* and in proximity to an upper end of the planet shaft 132.

The planet gear unit 130 further comprises a primary gear 134 which is rotationally fixed to the planet shaft 132. The primary gear 134 exhibits primary planet teeth which mesh with corresponding teeth of the ring gear 122. A secondary planet gear 135 is rotationally fixed to the planet shaft 132, in proximity to a lower end of the planet shaft 132, such the first planet bearing 133*a* is arranged axially between the primary gear 134 and the to secondary planet gear 135. The secondary planet gear 135 is provided with secondary planet teeth which mesh with corresponding teeth of a sun wheel 140, which is axially aligned with the first in- or output shaft 120. In the example shown in FIG. 2, the sun wheel 140 is rotationally fixed to a second in- or output shaft 150 which constitutes shaft of a rotating electrical machine such as a motor or a generator 152.

As readily understood the sun wheel 140 thus meshes with all secondary planet gears 135 and the torque transmitted between the first in- or output shaft 120 and the second in- or out put shaft is distributed between all planet gear units 130.

The secondary planet gear 135 of each planet unit 130 is further connected to the respective primary planet gear 134 by means of a transmission arrangement which is arranged to allow a limited elastic rotation of the secondary planet teeth in relation to the primary planet teeth. This transmission arrangement allows for that the total load of the gear arrangement will be evenly distributed between all cog flanks which are simultaneously in engagement during transmission of torque. Additionally, the transmission arrangement allows for that intermittent fluctuations in the transmitted torque and the corresponding load is absorbed such that heavy and rapid cog flank impacts are reduced. The transmission arrangement and possible variations thereof is described more in detail below.

FIGS. 3*a-d* and 4*a-b* illustrate schematically a compound planet gear arrangement according to a second aspect of the invention. According to this aspect, the gear arrangement comprises means for allowing the gear ratio to be altered between two selectable gear ratios.

Figure 3A:
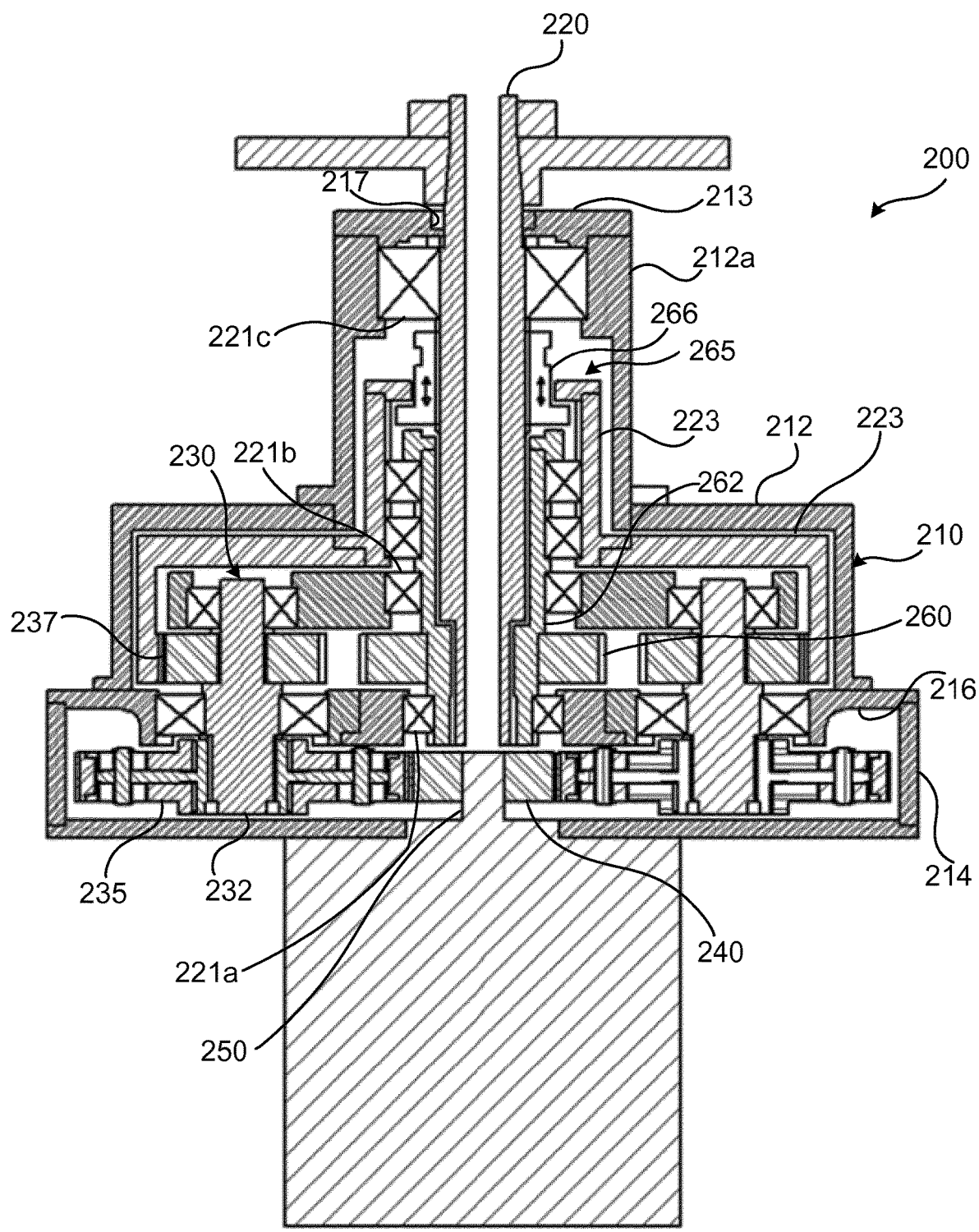
FIG. 3a is a section trough a gear arrangement according to a third embodiment.
Figure 3D:
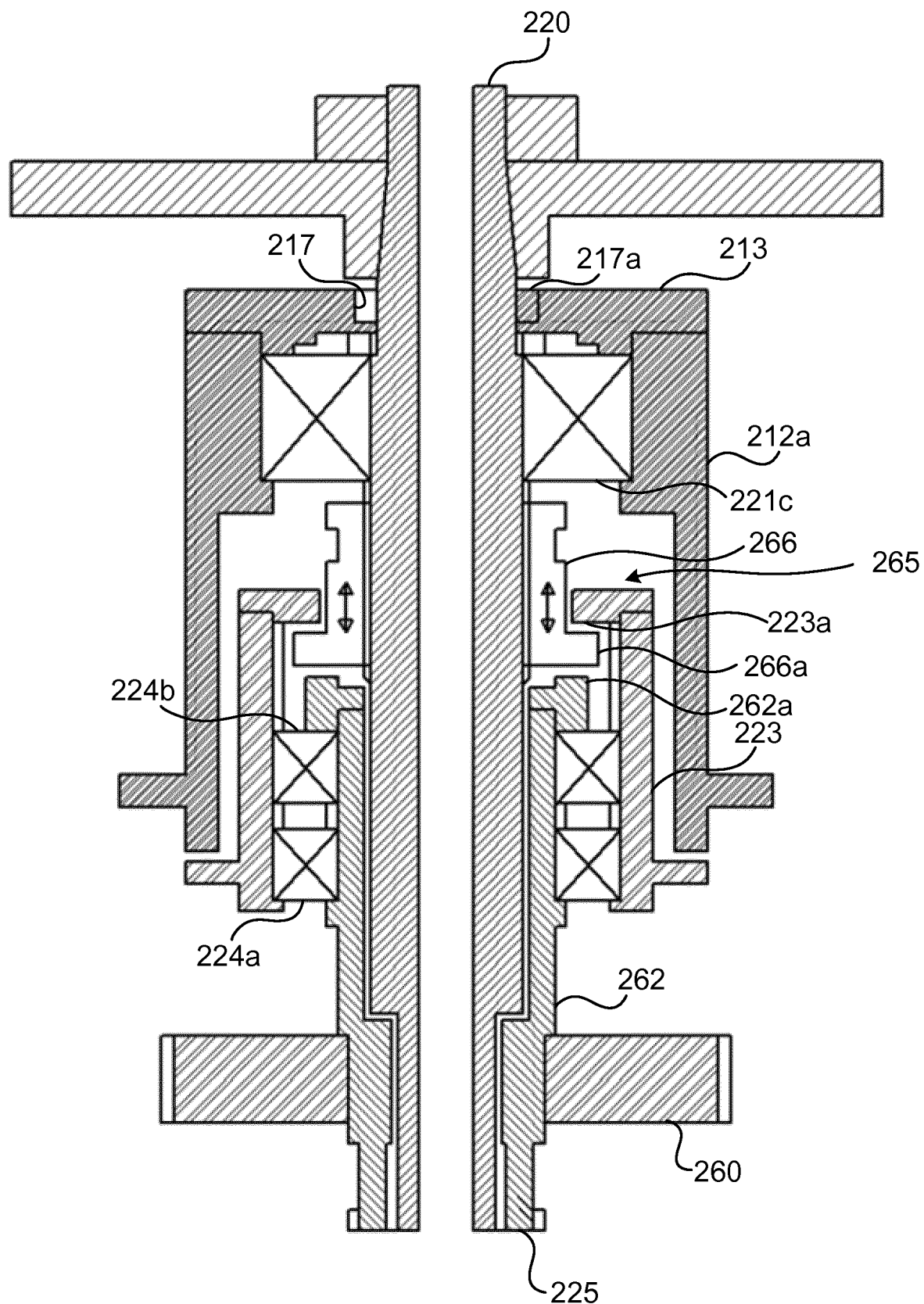
Figure 4A:
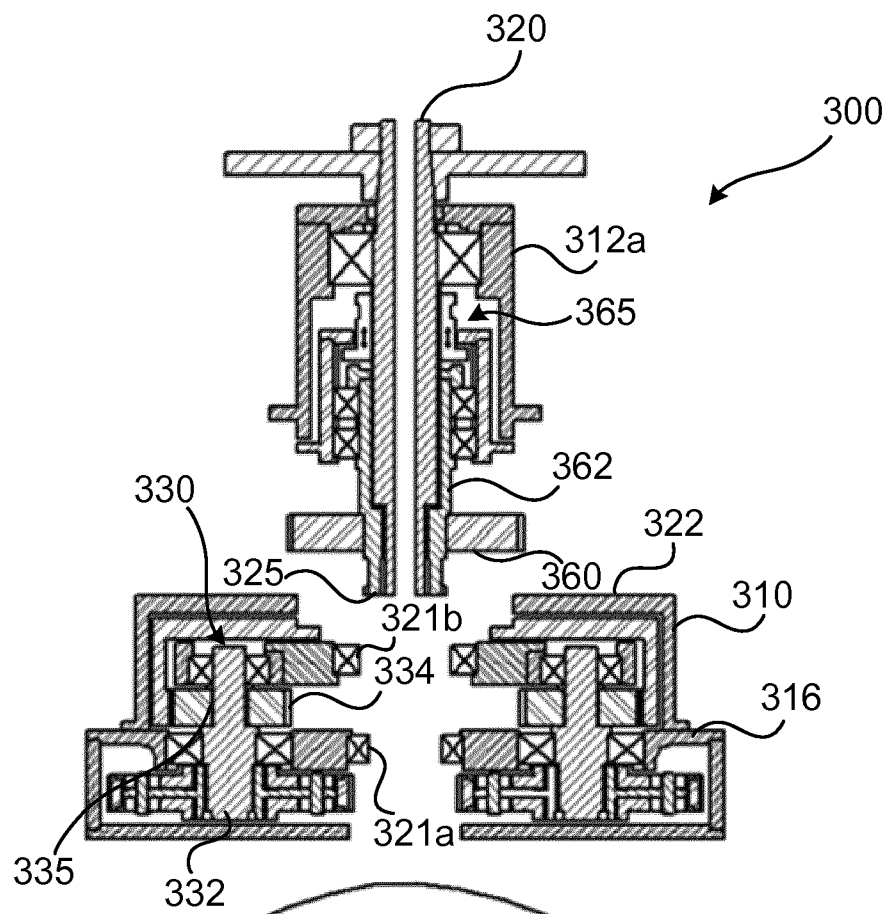
FIG. 4a is an exploded section showing a gear arrangement according to a fourth embodiment and FIG. 4b is an elevational view thereof.
Figure 4B:
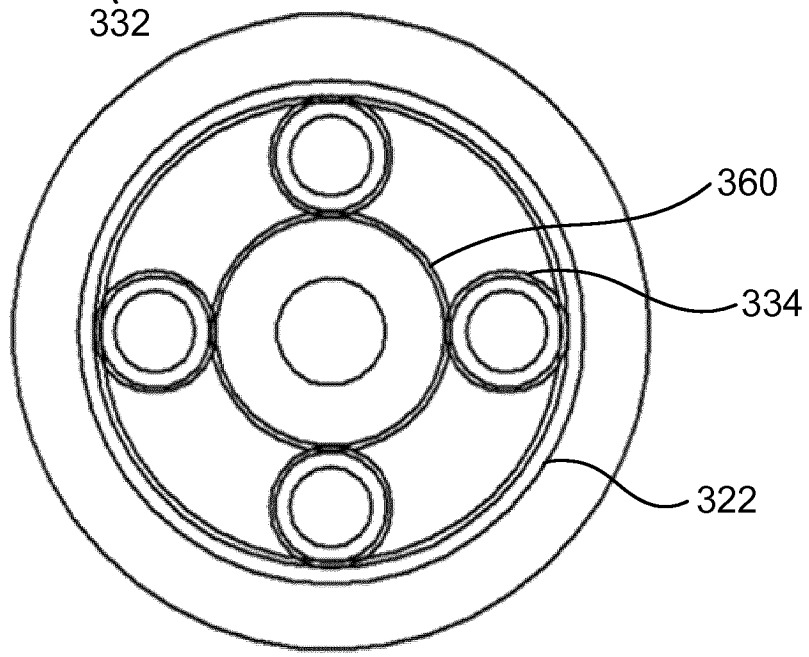

FIG. 3*a-d* illustrates a first embodiment and FIGS. 4*a-b* a second embodiment of this aspect. In the embodiment shown in FIGS. 3*a-c* the gear arrangement comprises generally the same components as the embodiment shown in FIG. 1. Thus, the gear arrangement 200 comprises a housing 210 with a first end cap 212 and a second end cap 214 which are fixed to and encloses a structural body 216.

A first in- or output shaft 220 extends through a first shaft opening 217 in the first end cap 212. The first in- or output shaft 220 is journaled in the body 216 by means of first 221a and second 221b bearings which are axially spaced from each other.

The gear arrangement 200 comprises four of planet gear units 230, each comprising a planet shaft 232 journaled in the body 216, a primary gear 234 meshing with a ring gear 222 and a secondary gear 235 meshing with a first sun wheel 240. The first sun wheel is rotationally fixed to a second in- or output shaft 250 of a rotating electrical machine 252.

However, at this embodiment a second sun wheel 260 is rotationally fixed to a hollow sleeve member 262 which coaxially receives a lower portion of the first in- or out put shaft 220. The hollow sleeve member 262 is arranged to rotate freely about the first in- or output shaft 220. For this purpose, bearings 225 are arranged between the hollow sleeve member 262 and the first in- or output shaft 220. The sleeve member 262 is further journaled to the structural body 216 by means of bearings 221a, 221b. In this way the sleeve member as well as the first in- or output shaft are rigidly fixated relative to the structural body 216 and they may sustain heavy loads and bending forces. The second sun wheel 260 is operatively connected to the primary gears 234 of all planet units 230. At this embodiment the second sun wheel 260 is indirectly connected to the primary gears 234 by means of respective intermediate gears 264.

The gear arrangement 200 further comprises a clutch arrangement 265 which is arranged to selectively connect the ring wheel 222 or the second sun wheel 260 to the first in- or output shaft 220. The clutch arrangement 265 comprises an engagement member 266 which is rotationally fixed to the first in- or output shaft 220 and axially displaceable relative to the first in-or output shaft 220. In the shown example, the engagement member 266 comprises a hollow sleeve which receives an axial portion of the first in- or to output shaft 220. The sleeve and the first in- or output shaft 220 are provided with cooperating splines (not shown) for preventing relative rotation and allowing relative axial displacement them between. The ring gear 222 is fixed to a central ring wheel hub 222a which is arranged concentrically around the first in- or output shaft 220, the hollow sleeve member 262 and the engagement member 266.

As best seen in FIG. 3d, the engagement member 266 is provided with engagement means 266a such as teeth, dents or jaws which are arranged to selectively engage corresponding engagement means 266a, 262a on the ring wheel hub 223 and the hollow sleeve member 262 respectively. The clutch arrangement 265 further comprises drive means (not shown) for driving the engagement member 266 in either axial direction. Such drive means may e.g. be hydraulic, electric, pneumatic or the like as known in the art.

The first end cap 212 of the housing 210 comprises an axially protruding cylindrical head 212a which concentrically receives the ring wheel hub 223 and the clutch arrangement 265. A mounting disc 213 is arranged at the free end of the cylindrical head 212a and exhibits the first shaft opening 217. A annular seal 217a is arranged between the first in- or output shaft 220 and the mounting disc 213. The first in- or output shaft is further journaled in the cylindrical head 212a by means of third central bearings 221c which are arranged close to the free end of the cylindrical head 212a.

Additionally, two axially spaced ring wheel bearings 224a, 224b are arranged concentrically between the ring wheel hub 223 and the hollow sleeve member 262. By this means free relative rotation is allowed between the ring wheel 222, the second sun wheel 260 and the first in- or output shaft 220.

FIGS. 3a and 3d illustrates the gear arrangement 200 when the clutch arrangement 265 is set in a free spinning mode of operation. At this mode the engagement member 266a is axially positioned in between the corresponding engagement means 223a and 262a of the ring wheel hub 223 and the hollow sleeve member 262 respectively. Hereby the engagement member 266 is disengaged from both of the ring wheel hub 223 and the hollow sleeve member 262 such that rotation of the first input member 220 is not transmitted to either of the ring wheel 222 or the second sun wheel 260 and thereby not to the second in- or output shaft 250. Vice versa, rotation of the second in- or output shaft is transmitted to the planetary gear units 230, the ring wheel 222 and the second sun wheel 260, but not to the first in- or output shaft 220, which thus in this operational mode is allowed to spin freely.

By displacing the engagement member 266a upwardly from the position shown in FIG. 3d, the engagement means 266a of the engagement member 266 will be brought into engagement with the corresponding engagement means 223 of the ring wheel hub 223, such that rotational movement will be transmitted between the first 220 and second 260 in- or output shafts via the ring wheel 222, the planet units 230 and the first sun gear 250. Such transmission of rotational movement and torque will occur at a first gear ratio depending on the differences in diameters between the rotational components involved.

By instead displacing the engagement member 266a downwardly from the position shown in FIG. 3d, the engagement means 266a of the engagement member 266 will be brought into engagement with the corresponding engagement means 223 of the second sun wheel 260, such that rotational movement will be transmitted between the first 220 and second 260 in- or output shafts via second sun wheel 260, the intermediate gears 264, the planet units 230 and the first sun gear 250. Such transmission of rotational movement and torque will occur at a second gear ratio depending on the differences in diameters between the rotational components involved in this transmission.

It should be noted that, at the embodiment shown in FIG. 3a-d rotational movement in one direction of the first in- or output shaft will result in rotation of the second in- or output shaft 250 in a direction which is the same, irrespective of if clutch arrangement 265 is set to an operational mode to involve the ring gear 222 or the second sun wheel 260 for transmitting the rotation and the torques. This occurs due to the intermediate gears 264 which reverse the rotational direction between the second sun wheel and the primary gears 234 in comparison to if the second sun wheel 260 would be arranged to mesh directly with the primary gears 234.

In FIGS. 4a and 4b an alternative embodiment of the first aspect is illustrated. At this embodiment, the gear arrangement 300 is essentially equal to the gear arrangement 200 shown in FIGS. a-d and comprises a housing 310 with a cylindrical head 312a and a body 316. A first in- or output shaft is journaled in bearings in the body 316 and in the cylindrical head 312a. The gear arrangement 300 also comprises four planet gear units 330 and a first sun wheel (not shown) which is connectable to a second in- or output shaft (not shown). A clutch arrangement 365 which is identical to the clutch arrangement 265 shown in FIG. 3d is also provided. A second sun wheel 360 is rotationally fixed to a hollow sleeve member 360 rotationally arranged around the first in- or output shaft 320. The sleeve member 360 is journaled to the structural body 316 by means of bearings 321a, 321b and to the first in- or output shaft 320, by means of bearings 325.

However, at this embodiment the second sun wheel 360 is operatively connected directly to the primary gear 234 of each planet unit 330. The second sun wheel 360 thus meshes with these primary gears. By eliminating the intermediate gears, the second sun wheel 260 may be given a larger diameter, thus providing a total gear ration which differs from the gear ration achieved when the second sun wheel of the embodiment shown in FIGS. 3a-d is involved in transmitting rotational movement and torque between the first and second in- or output shafts.

As indicated above, at this embodiment rotation of the first in- or output shaft 330 in a certain direction will result in a rotation of the second in- or output shaft in opposite rotational directions depending on if the clutch arrangement 365 is set to transmit the rotational movement via the ring gear 322 or the second sun gear 360.

FIGS. 5 and 6 illustrate schematically a compound planet gear arrangement according to a third aspect of the invention. According to this aspect, the gear arrangement comprises alternative means for allowing the gear ratio to be altered between two selectable gear ratios.

FIG. 5 illustrates a first embodiment and FIG. 6 a second embodiment of this third aspect. In the embodiment shown in FIG. 5 the gear arrangement comprises generally the same components as the embodiment shown in FIG. 1. Thus, the gear arrangement 400 comprises a housing 410 with a first end cap 412 and a second end cap 414 which are fixed to and encloses a body 416.

A first in- or output shaft 420 extends through a first shaft opening 417 in a mounting disc 413 of the first end cap 412. The first in- or output shaft 420 is journaled in the body 416 by means of first 421a and second 421b bearings which are axially spaced from each other.

The gear arrangement 400 comprises three planetary units 430 (only one of which is shown in the section of FIG. 5, each comprising a planet shaft 432 journaled in the body 416 by first 433a and second 433b planet bearings. At this embodiment, the planet shafts 432 are additionally journaled in the end wall 415 of the second end cap 414, by means of respective third planet bearings 433c. Each planet unit 430 further comprises a primary gear 434 meshing with a ring gear 422, which is rotationally fixed to the first in- or output shaft 420.

At this embodiment, each planet unit 430 comprises a first 435a and a second 435b secondary gear. The secondary gears 435a, 435b are axially aligned and fixed to the planet shaft ₄₃2, one above the other. Both secondary gears 435a, 435 are provided with a transmission arrangement which allows a limited elastic rotation of the secondary planet teeth in relation to the primary planet teeth of the respective primary gear 434. The first secondary gear 435a has a diameter which is smaller than the diameter of the second secondary gear 435b.

The gear arrangement further comprises a first 540a and a second 540b sun wheel. Both sun wheels 540a, 540b are rotationally connected to a second in- or output shaft 450 by means of respective bearings 451a, 451b. Each sun wheel 440a, 440b may thus rotate independently relative to each other and to the second in- or output shaft 450. The diameter of the first sun wheel 440a is larger than the diameter of the second sun wheel 440a. The diameters of the sun wheels are adapted such that the first sun wheel meshes with the first secondary gears 435 and the second sun wheel 440b meshes with the second secondary gears 435b. The second in- or output shaft 450 constitutes an in- or output shaft of a rotating electrical machine 452.

A clutch arrangement 465 is arranged to selectively fix either of the sun wheels 440a or 440b to the second in- or output shaft 450 such that relative rotation is prevented between the selected sun wheel and the second in- or output shaft. In the shown embodiment, the clutch arrangement comprises an annular engagement member 466 which receives the second in- or output shaft 450. The second in- or output shaft and the engagement member 466 are provided with cooperating splines such that the engagement member 466 may be axially displaced along the second in- or output shaft 450 but is prevented from rotating relative thereto. The engagement member 466 comprises engagement means 466a, 466b which may be brought into engagement with respective corresponding engagement means 441a and 441b of the first 440a and second 440b sun wheel.

The clutch arrangement further comprises drive means such as hydraulic, electric or pneumatic means for displacing the engagement member between a first lower engagement position and a second upper engagement position. In the first engagement position, the lower engagement means 466a engages the corresponding engagement means 451a of the first sun wheel, whereas the upper engagement means 466b of the engagement member is released from the corresponding engagement means 441b of the second sun wheel 440a. In this position the first sun wheel 440a is rotationally fixed to the second in- or output shaft 450 whereas the second sun wheel 440b may rotate freely relative to the second in- or output shaft 450. At this engagement position a rotational movement will thus be transmitted between the first in- or output shaft 420 and the second in- or output shaft via the ring gear 422, the primary gears 434, the planet shafts 432, the first secondary gears 435a and the first sun wheel 440a at a first gear ratio.

If the engagement member 466 is displace upwardly to a second upper engagement position the upper engagement means 466b engages the corresponding engagement means 451b of the second sun wheel 440b, whereas the lower engagement means 466a of the engagement member is released from the corresponding engagement means 441a of the first sun wheel 440a. In this position the second sun wheel 440b is rotationally fixed to the second in- or output shaft 450, whereas the first sun wheel 440a may rotate freely relative to the second in- or output shaft 450. At this upper engagement position a rotational movement will thus be transmitted between the first in- or output shaft 420 and the second in- or output shaft via the ring gear 422, the primary gears 434, the planet shafts 432, the second secondary gears 435b and the second sun wheel 440b at a second gear ratio, which differs from the first gear ratio.

When the engagement member 466 is displace to an intermediate position between the first and second engagement positions it will not engage any of the sun wheels 440a, 440b, whereby these sun wheels will rotate independently of the second in- or output shaft 550, They will however still mesh with the secondary planet gears 435a, 435b and rotate together with these.

In FIG. 6 a further gear arrangement 500 is illustrated. This gear arrangement resembles the arrangement shown in FIG. 5 in that it comprises three planet gear units 530, each comprising a planet a shaft 532, a primary gear 534, two secondary gears 535a, 535b, two sun wheels 540a, 540b which are journaled to a second in- or output shaft 550 and a first clutch arrangement 565 for selectively Mocking either of the first 540a or second 540b sun wheels from rotation relative to the second in- or output shaft 550. This first clutch arrangement 565 is thus arranged to provide the same possibility to choose one of two gear ratios when transmitting rotational movement and torque between the first 520 and second 550 in- or output shaft as the arrangement shown in FIG. 5. FIG. 6 also illustrates an exemplifying drive means 567 for displacing the engagement member 566 upwardly and downwardly between the two engagement positions. In the shown example the drive means comprises an electrical actuator which is fixed to a removable mounting insert 516a which forms part of the structural body 516. The actuator comprises a movable member connected to the engagement member 566.

At this embodiment, the gear arrangement 500 is further provided with a free wheeling capability for allowing the first in- or output shaft 520 to rotate freely and independently from the ring gear 522 and the other rotational gear components.

The first in- or output shaft 520 is, at an inner end portion, journaled in an annular mounting insert 516a of the body 516 by means of first central bearing 521a. The housing 510 comprises a first end cap 512 with a head member 512a which is axially closed by means of a mounting disc 513 comprising a first shaft opening 517, through which the first in- or output shaft 520 extends. The first in- or output shaft 520 is journaled in second bearings 521b to the head member 512a.

The ring gear 522 is journaled in the body 516 by means of a ring gear bearing 524. A second clutch arrangement 570 is arranged for selectively connecting and disconnecting the ring gear with and from the first in- or output shaft 520. The second clutch arrangement 570 comprises a hollow engagement member 571 which receives an portion of the first in- or output shaft 520. The engagement member 571 and the first in- or output shaft are provided with cooperating splines for allowing the engagement member to be axially displaced along the first in- or output shaft and to prevent relative rotation them between. The engagement member 571 comprises first engagement means 571a, such as teeth or dog jaws which are arranged to be brought in and out of engagement with corresponding engagement means 522a arranged at the ring gear 522. The second clutch arrangement 570 further comprises actuation means 572 which are fixed to the mounting insert 516a and which comprises an axially movable member which is connected to the engagement member 571 by means of a bearing 572a. By activation of the actuation means to drive the movable member upwardly the engagement member 571 is displaced upwardly such that the engagement means 571a are brought out of engagement with the corresponding engagement means 522a. By this means the first in- our output shaft 520 is completely disconnected from the ring gear 522 and the further gears of the gear arrangement such that it may spin freely with very little friction. Activation of the actuator means 572 for driving the movable member and thereby the engagement member in the opposite downward direction brings the engagement means 571a into engagement with the corresponding engagement 522a means on the ring gear 522 such that the ring gear is rotationally fixed relative to the first in- or output shaft whereby rotational movement and torque may be transmitted between the first 522 and second 550 in- or output shafts.

Figure 7:
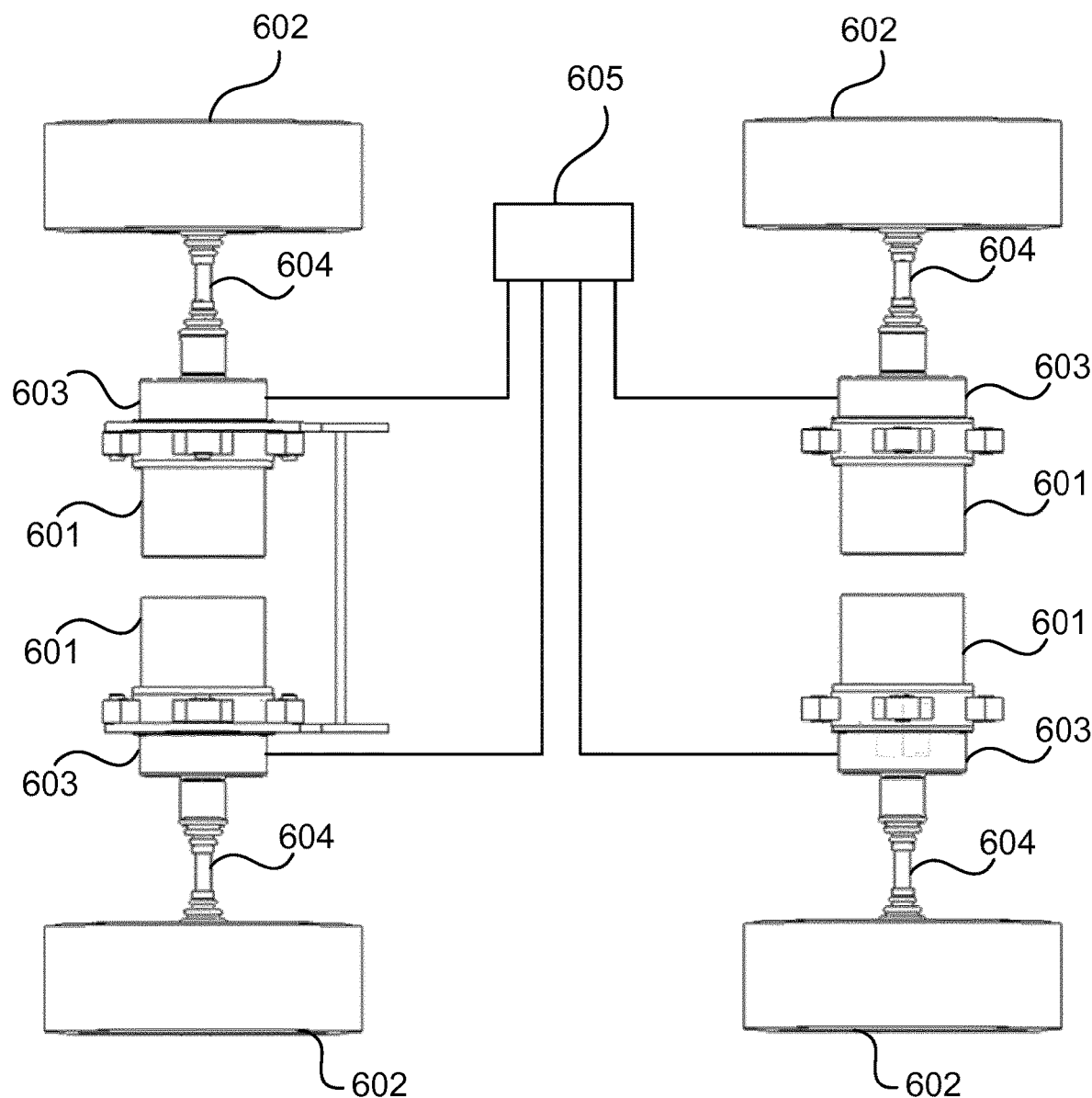
FIG. 7 is a schematic sketch illustrating an application of the invention.

FIG. 7 illustrates schematically an electric vehicle at which four gear arrangements according to the invention are used in a drive train of the vehicle. The vehicle comprises four electric motors each being connected to a respective wheel 602 by means of a respective compound planet gear arrangement 603 according to the invention and a wheel axle 604. The gear arrangement my preferably be of the type illustrated in FIG. 6 providing two selectable gear ratios and free wheel capability of the outgoing shaft which is connected to the wheel axle. At this application a central electronic control unit 605 is electrically connected to each of the gear arrangement for accurate control of the actuating means of the first and second clutch arrangements. The control unit 605 collects information concerning various driving conditions from numerous sensors (not shown), processes the information and sends signals to the gear arrangements 603 for optimizing for instance the gear ratio and free wheel functionality of each gear arrangement with respect to the momentarily prevailing driving conditions.

As mentioned above, compound planet gear arrangements by definition constitutes over determined systems. According to a fourth aspect the invention concerns a gear wheel arrangement which capable of reducing the negative effects of such over determined systems.

FIGS. 8a-c illustrate a gear wheel arrangement 700 which may be comprised in a transmission arrangement for allowing a limited elastic relative rotation between the secondary planet teeth and the primary planet teeth in the planet gear units included in the compound planet gear arrangements described above. The gear wheel arrangement 700 comprises a first part 710 which is arranged to be rotationally fixed to a shaft (not shown) and a second part 730 which comprises peripheral gear teeth 721. Even though the gear teeth 721 shown in FIG. 8a-c are straight they should according to the invention be inclined or helical.

The second 720 part is rotatable relative to the first part 710. In the shown example the first part 710 comprises a cylindrical hub 711 with an axial bore 711a provided with axial splines arranged to cooperate with corresponding axial splines on the shaft. By this means the hub 711 and the entire first part 710 is prevented from rotating relative to the shaft when mounted. The second part 710 further comprises a circular flange or disc 712 which extends radially from the hub 711. The disc 712 exhibit a number of axial through holes 713 which are distributed circumferentially around the disc 712 at a radial distance from the hub 711. Each through hole receives a cylindrical pin 714 which is fixed to the disc 712 and extends axially upwards (as seen in the figures) from the disc 712.

The second part 720 comprises an annular member 722, the outer peripheral edge of which is provided with the helical gear teeth 721. The second part also comprises a circular carrier disc 723 with a central axial bore which receives the hub 711. A number of circular axial through openings, which number is equal to the number of pins 714 are circumferentially distributed around the carrier disc 723. The through openings 724 are positioned such that each pin 714 may be centrally positioned in a respective through opening 724 by angular adjustment of the carrier disc 723 with respect to the circular disc 712. The carrier disc 723 is further, at the periphery, provide with a number of circumferentially elongated adjustment holes 725 and the annular member 722 is provided with an equal number of treaded screw holes 726 arranged at the same radial distance from the rotational axis as the adjustment holes 725.

The first part 710 is provided with an annular stop disc 715 which is fixed to a free axial end of the hub 711. The stop disc 715 extends radially outwards from the periphery of the hubs 711 axial bore 711a such that it overlaps an inner portion of the carrier disc 723. In order to decrease the friction and enhance relative rotation between the first part 710 and the second part 720, the gear wheel arrangement comprises a number of bearings 741, 742, 743. In the shown example a cylindrical slide bearing 741 is arranged between the hub 711 and the carrier disc 723. A first annular slide bearing 742 is arranged around the hub 711, between inner portions of the circular disc 712 and the carrier disc 723 and a second annular slide bearing 743 is arranged around the hub 711, between inner portions of the stop disc 715 and the carrier disc 723.

The first 710 and second 720 parts are connected by means of a number of elastically deformable cylindrical bushings 750. Each bushing 750 comprises an elastic material which is received in a metallic sleeve 751. Each bushing is received in a respective through opening 724 and exhibits a central axial bore which receives a respective pin 714 when the bushing is mouthed. The bushings 750 are press-fitted to the pins 714 and the through openings 724. A locking washer 716 is fixed to the free end of each pin 714 for preventing the bushing 750 to be displaced along the pin.

The axial distance between the circular disc 712 and the stop disc 715 is greater than the axial thickness of the carrier disc 723. The bushings 750 are further press- fitted to the pins 714 and in the through openings 724 such that the carrier disc 723 is positioned and maintained centrally between the circular disc 712 and the stop disc 715.

The nominal angular adjustment, i.e., the nominal relative rotational position between the peripheral helical teeth 721 of the second part 720 and the hub 711, an thereby between the peripheral helical teeth 720 and any gear teeth arranged on a gear which is rotationally fixed relative to the hub is adjustable. The gear arrangement 700 therefore comprises adjustment means for adjusting the nominal relative rotational position between the gear teeth 721 of the second part 720 and the shaft. At the embodiment shown in FIGS. 8a-c the adjustment means comprises the elongate adjustment holes 725, the screw holes 726 and screws 727. Before tightening the screws 727, the annular member 722 is rotated such that the desired angular position of the helical gear teeth 721 relative to the hub 711, and thereby relative any gear teeth rotationally fixed in relation to the hub 711 is achieved. The elongate through holes 725 allow such angular adjustment in correspondence to the circumferential length of the holes 725. When the relative angular position is reached the screws 727 are tightened into the screw holes 726 whereby the relative angular position between the first part 710 and the second part 720 is locked.

Now, if a torque is applied to the second part 720 while the first part 710 is prevented from rotating, the elastically deformable material of the bushings will be deformed thereby allowing some limited elastic rotation between the second part 720 and the first part. The gear wheel arrangement thus exhibits a certain degree of circumferential torsional compliancy.

In addition to this, the inventive gear wheel arrangement also exhibits additional circumferential torsional compliance by the fact that the peripheral gear teeth 721 are helical and that the carrier disc 723 is arranged at a certain axial distance from the circular disc 712 and the stop disc 715. Again if a torque is applied between the first 710 and second 720 parts by an adjacent gear having corresponding helical teeth meshing with the helical teeth of the first part an axial force which is proportional to the angel of inclination of the helical teeth will be applied to the second part. Since the carrier disc 723 is arranged with an axial clearance to the circular disc 712 and the stop disc 715, this axial force will tend to displace the carrier disc 723 axially upwards or downwards depending on the rotational direction f the torque and the inclination angle of the helical teeth 721. Due to the elasticity to of the bushings 750, some axial displacement of the carrier disc 723 relative to the circular disc will then occur under further deformation of the bushings. While the previously described circumferential force applied to the second part causes mainly circumferential compression and stretching of the bushings 750, an axial force applied to the second part 720 will cause elastic shearing deformation of the bushings 750.

When the second part 720 is allowed to be displaced axially, the angular relation between the second part and the adjacent gear will change. Allowing relative movement between the second part 720 and the first part 710 both in the circumferential direction and the axial direction thus increases the torsional compliance of the gear wheel arrangement.

Even though the bushings are capable of elastically absorbing both circumferential relative movements and axial relative movements between the second 720 and the first 710 parts, it may at some applications be desirable to separately control the elastic resistance to relative axial movements. In such cases additional elastically deformable material (not shown) may be arranged between the circular disc 715 and the carrier disc 723 as well as between the stop disc 715 and the carrier disc 723. In addition the elasticity of the deformable material of the bushings as well as of such additional deformable material may be chosen separately thereby allowing precise control of the relative movements in the circumferential and the axial directions respectively.

When applying the inventive gear wheel arrangement to the compound planet gear arrangements described above, the gear wheel arrangement is preferably used as a secondary gear which is rotationally fixed to the planet gear shaft by means of the splined hub 711. Since a primary gear of the planet gear unit is rotationally fixed to the planet gear shaft the so arranged planet gear unit will constitute a transmission arrangement which allows a limited elastic rotation of the secondary planet teeth relative to the primary planet teeth. By this means, the negative effects of the over-determination of the compound planet gear arrangement is strongly reduced and the total load of the gear arrangement is evenly distributed between all cog flanks simultaneously in engagement. In addition the enhanced compliance of the of the gear wheel arrangement contributes to absorb intermittent torques and loads thereby providing a smooth running of the compound planet gear arrangement.

An additional advantage of applying the above described gear wheel arrangement to compound planet gear arrangements is that the use of helical gear teeth considerably reduces the noise in comparison to gear arrangement with straight gear teeth.

Figure 9:
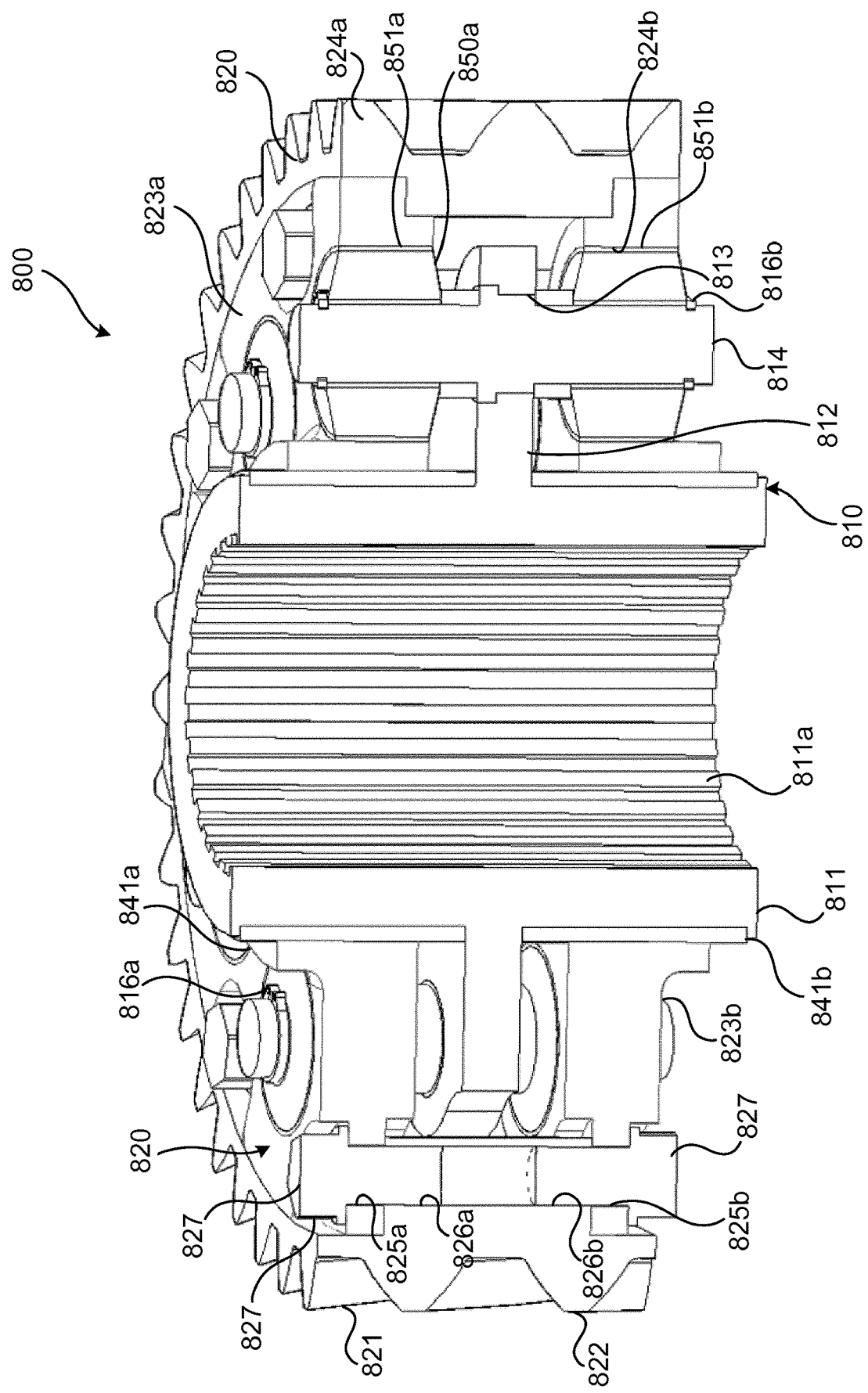
FIG. 9 is a section in perspective view illustrating another embodiment of a gear wheel arrangement according to the invention.

FIG. 9 illustrates a further embodiment of the gear wheel arrangement according to the invention. At this gear wheel arrangement 800, the first part 810 comprises a splined central hub 811 which is arranged to receive a shaft (not shown). An annular flange extends radially from the hub 811. A number of pins b14 are received in through holes 813 in the flange 812. The pins 814 extend axially on both sides of the flange 812. A first bushing 850a comprising an elastically deformable material received in a sleeve 851a is arranged on the pin at a first side of the flange 812. A second bushing 850b comprising elastically deformable material received in a sleeve 851b is arranged on the pin also at the opposite second side of the flange 812. All bushings 850a on the first side of the flange are received in through openings 824a of a first carrier disc 823a. Correspondingly, all bushings 850b on the second side of the flange 812 are received in through openings 824b of a second carrier disc 823b. The bushings 850a, 850b are press-fitted onto the respective ends of the pins 814 and into the through openings 824a, 824b. Locking washers 816a, 816b are arranged at the ends of the pins 814 for preventing the bushings 850a, 850b to come loose from the pins.

The first 823a and the second 823b carrier discs forms part of a second part 820 of the gear wheel arrangement and are fixed to a common annular member 822 which is provided with peripheral helical gear teeth 821.

In correspondence with the embodiment shown in FIGS. 8a-c the gear wheel arrangement 800 comprises adjustment means for adjusting the nominal relative angular or rotational position between the first part 810 and second part 820. These means comprises circumferentially elongated through holes 825a, 825b arranged in the carrier discs 823a, 823b, screw holes 826a, 826b arranged in the annular member 822 and screws 827. These means are used as described above for adjusting the nominal relative angular position between the first 810 and the second 820 part.

Just as at the embodiment shown in FIGS. 8a-c, are the bushings 850a, 850 capable to elastically absorb both relative circumferential and axial movement between the first 810 and second 820 part and the gear wheel arrangement 800 may be applied in a similar manner to the compound gear arrangements described above. However, at this embodiment the stop ring has been omitted. Here instead the maximum axial displacement of the second part 820 relative to the first part 810 is reached when either of the carrier discs 823a, 823b has been axially displaced such that it makes contact with the flange 812.

Figure 10A:
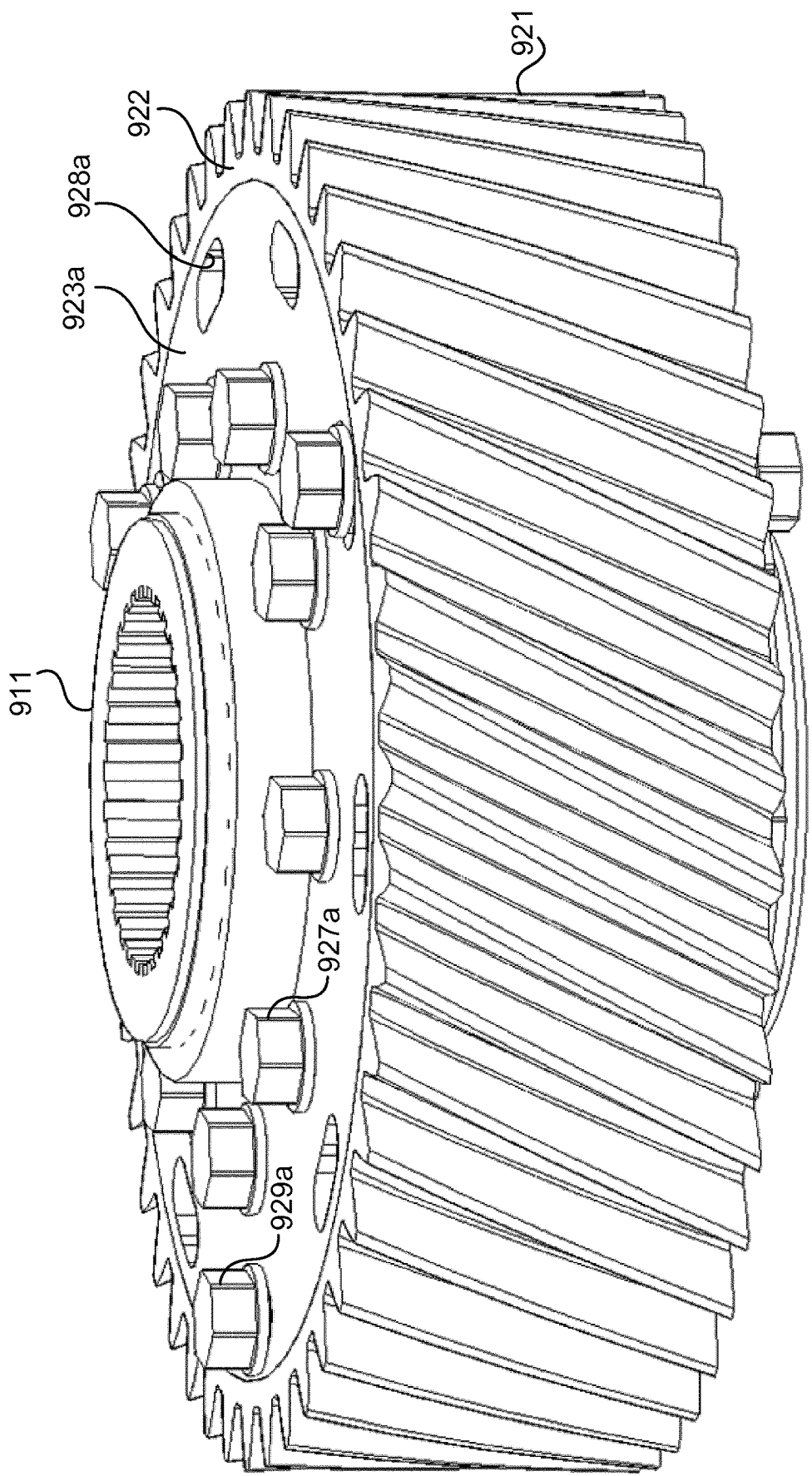
FIG. 10a is a perspective view of illustrating a further embodiment of the gear wheel arrangement.
Figure 10B:
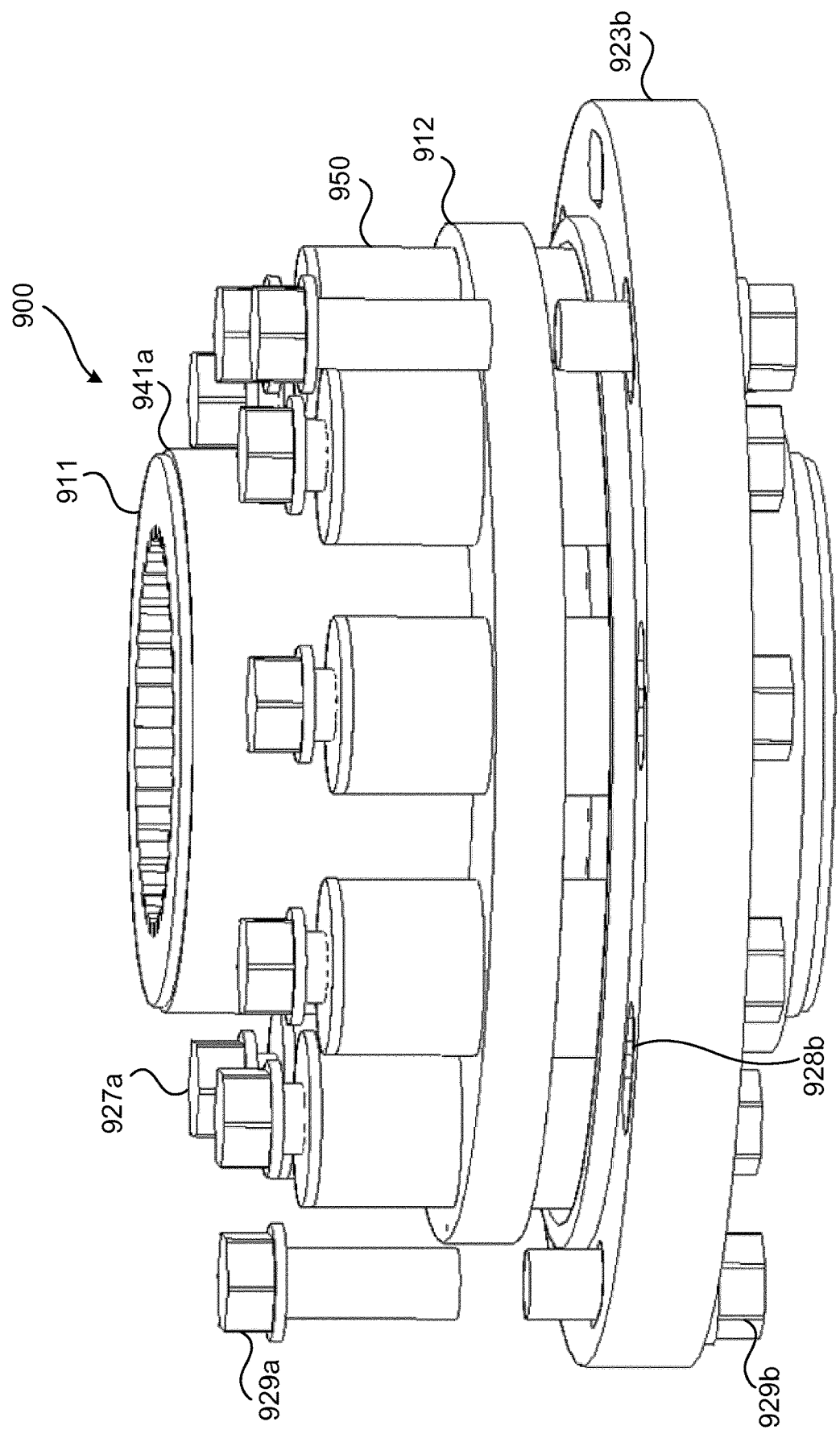
FIG. 10b is a corresponding view with some components removed and FIG. 10c is a section thereof.
Figure 10C:
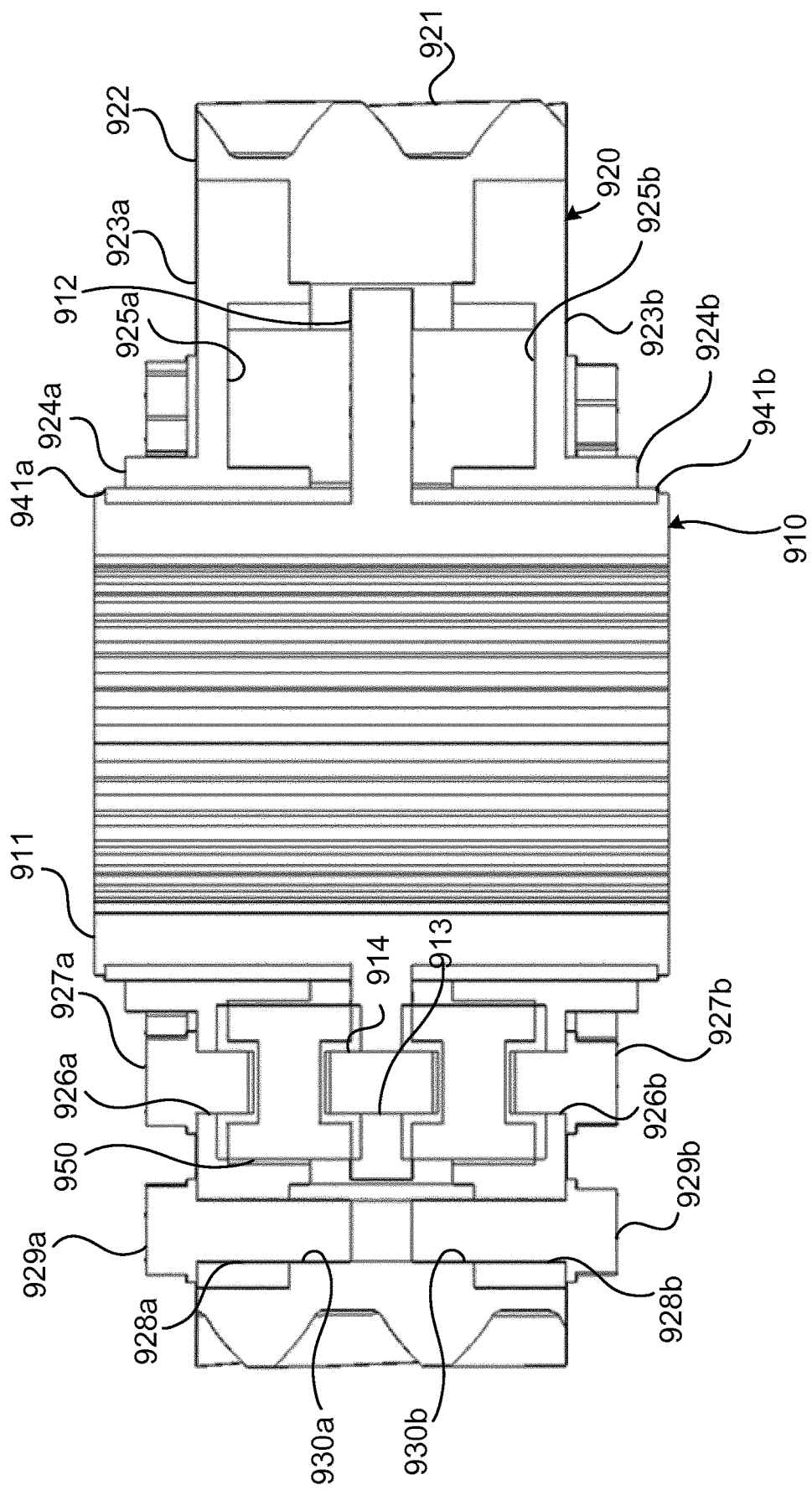

FIGS. 10a-10c illustrates a gear wheel arrangement 900 according to a further embodiment. The gear wheel arrangement 900 comprises a first part 910 which comprises a splined central hub 911 which is arranged to receive a shaft (not shown). An annular disc or flange 912 extends radially from the hub 911. A number of axial through holes 913 are distributed in the circumferential direction of the flange 912. A stud 914 is threadedly engaged in each through opening 913 and extends axially a certain distance in each axial direction from the flange 912. The gear wheel arrangement further comprises a number of cylindrical bushings 950. The bushings 950 exhibit at each axial end a central axially extending circular recess such that a longitudinal section of the bushing is generally H-shaped. A bushing 950 is arranged at each stud 914 such that the stud 914 is received in the central recess.

The gear wheel arrangement further comprises a second part 920, which at this embodiment comprises an annular member 922 with peripheral helical teeth 921, a first carrier disc 923a and a second carrier disc 923b. The first 923a and second 923b carrier discs each comprises radially inner cylindrical sleeve portions 924a, 924b which are threaded onto the hub 911 from a respective axial end. By this means the first 923a and second 923b carrier discs are arranged at opposite sides of the flange 912. A first tubular bearing 941a is arranged between the hub 911 and the first sleeve portion 924a. A second tubular bearing 941b is arranged between the hub 911 and the second sleeve portion 924b. Both carrier discs 923a, 923b may thus be rotated about the hub 911 and axially displaced along the hub 911 at low friction. Instead of using tubular bearings many other types may also be used such as e.g. needle bearings or hydrostatic bearings.

The first 923a and second 923b carrier discs each exhibits a circumferential grove 925a, 925b which is open towards the flange 912. End portions of the bushings 950 arranged on the studs 914, which end portions faces away from the flange 912 are received in the are grooves 925a, 925b. The carrier discs 923a , 923b are provided with threaded through holes 926a, 926b which may be aligned with the studs 914. When so aligned, fixation screws 927a, 927b are fixed in the through holes 926a, 926b such that through penetrating screw portions engages the circular recesses of the bushings, which recesses are arranged at the axial end of the bushings which faces away from the flange 912.

The carrier discs 923a, 923b are finally fixed to the first part 910 by securing fixating screws 929a, 929b which extend through circumferential elongated through holes 928a, 928b arranged at the periphery of the carrier discs 923a, 923b and are threadedly engaged in fixation holes 930a 930b in the annular member 922. Before the fixation screws 929a, 929b have been fully secured, nominal angular adjustment may be accomplished by rotating the carrier discs 923a, 923b and the annular member 922 relative to the first by utilizing the circumferential extension of the through holes 928a, 928b.

It should de noted that the axial height of the bushings 950 is greater than the axial distance between the flange 915 and the bottom of the grooves 925a, 925b. This allows for that the bushings are axially pretensioned by tightening the fixation screws 929a, 929b.

As readily understood, the tubular bearings 941a, 941 allows for that the second part may be moved both rotationally and axially relative to the first par at low friction.

Just as at the embodiments shown in FIGS. 8a-c and 9, are the bushings 950 capable to elastically absorb both relative circumferential and axial movement between the first 910 and second 920 part and the gear wheel arrangement 900 may be applied in a similar manner to the compound gear arrangements described above.

Above certain exemplifying embodiments of the invention has been described. The invention is however not limited to these embodiments but it may freely be varied within the scope of the appended claims.

The invention claimed is:
1. A gear wheel arrangement, comprising;
a first part which is arranged to be rotationally fixed to a shaft;
a second part which is rotatably connected to the first part and provided with gear teeth for meshing with an adjacent gear; and
at least one bearing arranged between the first part and the second part for reducing the friction between the first and second part during relative rotation,
wherein the first and second parts are mechanically connected by means of at least one first elastically deformable member which allows a limited relative rotation between the first and second part,
characterized in that
the gear teeth of the second part are helical and that the gear wheel arrangement is arranged to allow a limited relative axial and linear displacement between the first part and the second part.
2. The gear wheel arrangement according to claim 1, wherein said at least one first elastically deformable member is deformed during relative rotational displacement between the first part and the second part.
3. The gear wheel arrangement according to claim 2, wherein said at least on first elastically deformable member comprises a polymer material.
4. The gear wheel arrangement according to claim 1, wherein said at least one first elastically deformable member is arranged to be deformed during relative axial displacement between the first part and the second part.

5. The gear wheel arrangement according to claim 1, comprising at least one second elastically deformable member, which is arranged to be deformed during relative axial displacement between the first part and the second part.

6. The gear wheel arrangement according to claim 1, wherein the first part comprises a central hub with an axial bore for receiving the shaft and at least one first contact member which is arranged at a radial distance from a central axis of the hub; wherein the second part comprises at least one second contact member and an annular toothed member, wherein the gear teeth comprise peripheral helical teeth arranged on said annular toothed member; and wherein said elastically deformable member is arranged between said first and second contact members.

7. The gear wheel arrangement according to claim 6, wherein the first part comprises a radial disc which extends radially from the hub and which carries a number of first contact members extending axially from the radial disc, wherein the second part comprises at least one carrier disc which is fixed to the toothed member and which exhibits a number of recesses corresponding to the number of first contact members; and wherein at least one of said at least one elastically deformable members is annular and is received in each recess about each first contact member.

8. The gear wheel arrangement according to claim 7, the second part comprises two carrier discs arranged at opposite axial sides of the radial disc.

9. The gear wheel arrangement according to claim 1, comprising adjustment means for adjusting the nominal relative rotational position between the gear teeth of the second part and the shaft.

10. A gear wheel arrangement, comprising;
a first part which is arranged to be rotationally fixed to a shaft;
a second part which is rotatably connected to the first part and provided with gear teeth for meshing with an adjacent gear;
wherein the first and second parts are mechanically connected by means of at least one first elastically deformable member which allows a limited relative rotation between the first and second part,
characterized in that
the gear teeth of the second part are helical and that the gear wheel arrangement is arranged to allow a limited relative axial and linear displacement between the first part and the second part,
wherein the first part comprises a central hub with an axial bore for receiving the shaft and at least one first contact member which is arranged at a radial distance from a central axis of the hub; wherein the second part comprises at least one second contact member and an annular toothed member, wherein the gear teeth comprise peripheral helical teeth arranged on said annular toothed member; and wherein said elastically deformable member is arranged between said first and second contact members, and
wherein the first part comprises a radial disc which extends radially from the hub and which carries a number of first contact members extending axially from the radial disc, wherein the second part comprises at least one carrier disc which is fixed to the toothed member and which exhibits a number of recesses corresponding to the number of first contact members; and wherein at least one of said at least one elastically deformable members is annular and is received in each recess about each first contact member.

11. A gear wheel arrangement, comprising;
a first part which is arranged to be rotationally fixed to a shaft;
a second part which is rotatably connected to the first part and provided with gear teeth for meshing with an adjacent gear; and
adjustment means for adjusting the nominal relative rotational position between the gear teeth of the second part and the shaft,
wherein the first and second parts are mechanically connected by means of at least one first elastically deformable member which allows a limited relative rotation between the first and second part,
characterized in that
the gear teeth of the second part are helical and that the gear wheel arrangement is arranged to allow a limited relative axial and linear displacement between the first part and the second part.

\* \* \* \* \*